US009919963B2

(12) United States Patent
Bookbinder et al.

(10) Patent No.: US 9,919,963 B2
(45) Date of Patent: Mar. 20, 2018

(54) GLASS WITH ENHANCED STRENGTH AND ANTIMICROBIAL PROPERTIES, AND METHOD OF MAKING SAME

(71) Applicant: CORNING INCORPORATED, Corning, NY (US)

(72) Inventors: Dana Craig Bookbinder, Corning, NY (US); Nicholas Francis Borrelli, Elmira, NY (US); Delena Lucinda Justice Duffy, Lindley, NY (US); Richard Michael Fiacco, Corning, NY (US); Georgiy M Guryanov, Horseheads, NY (US); Ekaterina Aleksandrovna Kuksenkova, Painted Post, NY (US); Sumalee Likitvanichkul, Painted Post, NY (US); Anantha Narayanan Subramanian, Corning, NY (US); Wageesha Senaratne, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 365 days.

(21) Appl. No.: 14/618,469

(22) Filed: Feb. 10, 2015

(65) Prior Publication Data

US 2015/0225288 A1     Aug. 13, 2015

Related U.S. Application Data

(60) Provisional application No. 61/939,322, filed on Feb. 13, 2014.

(51) Int. Cl.
*B32B 15/04* (2006.01)
*B32B 17/06* (2006.01)
*C03C 21/00* (2006.01)

(52) U.S. Cl.
CPC .......... *C03C 21/005* (2013.01); *C03C 21/002* (2013.01); *C03C 2204/02* (2013.01); *Y10T 428/315* (2015.01)

(58) Field of Classification Search
USPC ....... 428/426, 428, 432, 434, 409, 410, 701, 428/702
See application file for complete search history.

(56) References Cited

U.S. PATENT DOCUMENTS

| | | | |
|---|---|---|---|
| 3,549,344 A | 12/1970 | Loukes et al. | 65/30 |
| 5,078,772 A | 1/1992 | Asahara et al. | 65/30.13 |

(Continued)

FOREIGN PATENT DOCUMENTS

| | | | |
|---|---|---|---|
| CN | 102388002 A | 3/2012 | C03C 17/00 |
| DE | 102005039298 | 2/2007 | C03C 21/00 |

(Continued)

OTHER PUBLICATIONS

Patent Cooperation Treaty International Notification of Transmittal of the International Search Report and the Written Opinion of the International Searching Authority, international application No. PCT/US2015/014556: dated May 19, 2015, 11 pages.

(Continued)

*Primary Examiner* — Lauren R Colgan
(74) *Attorney, Agent, or Firm* — Kevin M. Johnson

(57) ABSTRACT

A method of making an antimicrobial glass article that includes the steps: submersing the article in a strengthening bath to exchange a portion of ion-exchangeable metal ions in the glass article with a portion of ion-exchanging metal ions in the strengthening bath to form a compressive stress layer extending from the first surface to a diffusion depth in the article; removing a portion of the compressive stress layer from the first surface of the article to a first depth above the diffusion depth in the article to define a new first surface (Continued)

and a remaining compressive stress layer; and submersing the article in an antimicrobial bath to exchange a portion of the ion-exchangeable and the ion-exchanging metal ions in the compressive stress layer with a portion of the silver metal ions in the antimicrobial bath to impart an antimicrobial property in the article.

16 Claims, 13 Drawing Sheets

(56) References Cited

U.S. PATENT DOCUMENTS

| | | | |
|---|---|---|---|
| 5,151,958 A | 9/1992 | Honkanem | 385/50 |
| 6,831,028 B1 | 12/2004 | Ishii et al. | |
| 6,921,546 B2 | 7/2005 | Albach | |
| 7,232,777 B1 | 6/2007 | Van Hyning | 442/123 |
| 7,704,903 B2 | 4/2010 | Senschal et al. | |
| 8,034,732 B2 | 10/2011 | Kobayashi et al. | |
| 8,232,218 B2 | 7/2012 | Dejneka et al. | 501/68 |
| 8,312,739 B2 | 11/2012 | Lee et al. | 65/30.14 |
| 8,561,429 B2 | 10/2013 | Allan et al. | 65/30.13 |
| 8,753,657 B2 | 6/2014 | Kobayashi et al. | |
| 9,017,708 B2 | 4/2015 | Kobayashi et al. | |
| 9,439,439 B2 | 9/2016 | Borrelli et al. | |
| 2006/0172877 A1 | 8/2006 | Fechner et al. | |
| 2007/0172661 A1* | 7/2007 | Fechner | A01N 59/16 428/409 |
| 2008/0190140 A1 | 8/2008 | Selig | |
| 2009/0142568 A1 | 6/2009 | Dejneka et al. | 428/220 |
| 2009/0162695 A1 | 6/2009 | Hevesi et al. | |
| 2009/0220761 A1 | 9/2009 | Dejneka et al. | 428/220 |
| 2010/0009154 A1 | 1/2010 | Allan et al. | 428/220 |
| 2010/0028607 A1 | 2/2010 | Lee et al. | 428/153 |
| 2010/0035038 A1 | 2/2010 | Barefoot et al. | 428/220 |
| 2010/0071415 A1 | 3/2010 | Voss et al. | 65/22 |
| 2011/0081542 A1 | 4/2011 | Pilloy et al. | 428/341 |
| 2011/0165393 A1* | 7/2011 | Bayne | C03C 15/02 428/215 |
| 2011/0201490 A1 | 8/2011 | Barefoot et al. | |
| 2011/0293942 A1 | 12/2011 | Cornejo et al. | 428/410 |
| 2012/0034435 A1* | 2/2012 | Borrelli | C03C 17/30 428/210 |
| 2012/0052271 A1 | 3/2012 | Gomez et al. | 428/213 |
| 2012/0135226 A1 | 5/2012 | Bookbinder et al. | |
| 2012/0216569 A1 | 8/2012 | Allan et al. | 65/30.14 |
| 2012/0219792 A1* | 8/2012 | Yamamoto | C03C 3/087 428/336 |
| 2013/0130023 A1 | 5/2013 | Boulanger et al. | 428/336 |
| 2013/0219965 A1 | 8/2013 | Allan et al. | 65/30.14 |
| 2013/0224492 A1 | 8/2013 | Bookbinder et al. | 428/410 |
| 2014/0092377 A1 | 4/2014 | Liu et al. | 356/51 |
| 2014/0118740 A1 | 5/2014 | Fontaine et al. | 356/364 |
| 2014/0370066 A1 | 12/2014 | Beall et al. | |

FOREIGN PATENT DOCUMENTS

| | | | |
|---|---|---|---|
| EP | 250635 | 12/1990 | G03B 13/36 |
| EP | 1270527 | 2/2005 | A01N 25/08 |
| EP | 2021296 A1 | 2/2009 | C03C 11/00 |
| EP | 2064220 | 10/2010 | C07F 7/18 |
| EP | 1828071 | 2/2011 | C03C 17/00 |
| JP | 3146436 A | 6/1991 | |
| JP | 9067143 A | 3/1997 | |
| JP | 10158037 A | 6/1998 | |
| JP | 11060277 A | 3/1999 | |
| JP | 11228186 A | 8/1999 | |
| JP | 11319042 | 11/1999 | B65D 1/00 |
| JP | 2000264674 A | 9/2000 | |
| JP | 2000302478 A | 10/2000 | |
| JP | 2000313624 A | 11/2000 | |
| JP | 2000327364 A | 11/2000 | |
| JP | 2001026466 A | 1/2001 | |
| JP | 200180941 | 3/2001 | C03C 21/00 |
| JP | 2001097735 A | 4/2001 | |
| JP | 2001122638 A | 5/2001 | |
| JP | 03218096 B2 | 10/2001 | |
| JP | 03248279 B2 | 1/2002 | |
| JP | 200053451 | 2/2002 | A61L 2/16 |
| JP | 2002037643 A | 2/2002 | |
| JP | 03486951 B2 | 1/2004 | |
| JP | 2010138025 A | 6/2010 | C03C 21/00 |
| JP | 2011133800 | 7/2011 | G09F 9/00 |
| JP | 04916503 B2 | 4/2012 | C03C 21/00 |
| JP | 2012079133 A | 4/2012 | G06F 3/041 |
| JP | 05069482 B2 | 11/2012 | |
| JP | 05085803 B2 | 11/2012 | |
| KR | 1174402 B1 | 8/2012 | |
| KR | 1268956 | 5/2013 | C03C 15/00 |
| WO | 1999017188 A1 | 4/1999 | |
| WO | 2003082758 A1 | 10/2003 | |
| WO | WO2005/030665 | 4/2005 | C03C 21/00 |
| WO | 2005087675 A1 | 9/2005 | |
| WO | WO2006058906 | 6/2006 | A61L 27/30 |
| WO | WO2011065293 | 6/2011 | C03C 3/087 |
| WO | WO2011069338 | 6/2011 | C03C 3/087 |
| WO | 2011145592 A1 | 11/2011 | |
| WO | 20120019067 | 2/2012 | |

OTHER PUBLICATIONS

U.S. Appl. No. 61/908,369, "Method for Achieving a Stress Profile in a Glass."
U.S. Appl. No. 61/862,994, "Laser Controlled Ion Exchange Process and Glass Articles Formed Therefrom."
U.S. Appl. No. 14/174,309, filed Jun. 26, 2014, Mohd Shapee et al.
U.S. Appl. No. 14/280,741, filed Sep. 18, 2014, Will et al.
U.S. Appl. No. 61/835,722, "Methods of Characterizing the Ion Concentration in Double Ion-Exchanged Glasses."
U.S. Appl. No. 13/923,837, filed Nov. 13, 2014, Ahmed et al.

* cited by examiner

GLASS WITH ENHANCED STRENGTH AND ANTIMICROBIAL PROPERTIES, AND METHOD OF MAKING SAME

CROSS-REFERENCE TO RELATED APPLICATIONS

This application claims the benefit of priority under 35 U.S.C. § 119 of U.S. Provisional Application Ser. No. 61/939,322, filed on Feb. 13, 2014, the content of which is relied upon and incorporated herein by reference in its entirety.

TECHNICAL FIELD

The present invention generally relates to strengthened, antimicrobial glass articles and methods for making them for various applications including but not limited to touch screens for various electronic devices, e.g., mobile phones, laptop computers, book readers, hand-held video gaming systems, and automated teller machines.

BACKGROUND

In general, glass is an inherently strong material, but the actual strength values of articles made with glass materials are often limited by flaw sizes and distributions within, and at the surface of, these articles. Various processes, including ion-exchange baths, can be used to "chemically" strengthen glass articles. Ion-exchange bath processes, for example, can be used to increase the strength of a glass article by developing a compressive stress layer in a surface region of the article. For example, metal ions in the surface region of an as-produced glass article can be replaced by larger metal ions through ion-exchange processes. These larger metal ions create a local stress field, thereby generating the beneficial compressive stress layer.

Similarly, ion-exchange processes can be used to impart antimicrobial properties in a glass article by injecting certain metal ions, e.g. $Ag^+$, into the surface of the article. The $Ag^+$ ions interact with microbes at the surface of the glass article to kill them or otherwise inhibit their growth. However, the presence of these $Ag^+$ ions and/or the processes used to exchange them in a glass article might alter other characteristics of the glass articles (e.g., the compressive stress distribution in a chemically-strengthened glass substrate). Yet at the same time, relatively high levels of $Ag^+$ ions at the surface of the glass articles are required for acceptable antimicrobial performance. Further, $Ag^+$ ion precursors are relatively expensive materials to obtain and process.

Accordingly, there is a need for new processes for efficiently making strengthened glass articles with antimicrobial capabilities that do not significantly alter other performance attributes of these articles.

SUMMARY

According to one embodiment, a method of making an antimicrobial glass article is provided. The method includes the steps: providing a glass article having a first surface and a plurality of ion-exchangeable metal ions; providing a strengthening bath comprising a plurality of ion-exchanging metal ions larger in size than the ion-exchangeable metal ions; and providing an antimicrobial bath comprising a plurality of silver ions, a plurality of the ion-exchangeable metal ions and a plurality of the ion-exchanging ions, the bath having a concentration of silver nitrate at about 5% to about 100% by weight. The method also includes the steps: submersing the glass article in the strengthening bath to exchange a portion of the plurality of ion-exchangeable metal ions in the glass article with a portion of the plurality of the ion-exchanging metal ions in the strengthening bath to form a compressive stress layer extending from the first surface to a diffusion depth in the glass article; removing a portion of the compressive stress layer from the first surface of the glass article to a first depth above the diffusion depth in the glass article to define a new first surface and a remaining compressive stress layer; and submersing the glass article in the antimicrobial bath to exchange a portion of the ion-exchangeable and the ion-exchanging metal ions in the compressive stress layer with a portion of the plurality of the silver ions in the antimicrobial bath to impart an antimicrobial property in the glass article.

According to another embodiment, a method of making an antimicrobial glass article is provided. The method includes the steps: providing a glass article having a first surface and a plurality of sodium metal ions; providing a strengthening bath comprising a plurality of potassium metal ions; and providing an antimicrobial bath comprising a plurality of silver ions, a plurality of sodium metal ions and a plurality of potassium metal ions, the bath having a concentration of silver nitrate at about 5% to 100% by weight. The method also includes the steps: submersing the glass article in the strengthening bath to exchange a portion of the plurality of sodium metal ions in the glass article with a portion of the plurality of potassium metal ions in the strengthening bath to form a compressive stress layer extending from the first surface to a diffusion depth in the glass article; removing a portion of the compressive stress layer from the first surface of the glass article to a first depth above the diffusion depth in the glass article to define a new first surface and a remaining compressive stress layer; and submersing the glass article in the antimicrobial bath to exchange a portion of one or both of the sodium and the potassium metal ions in the compressive stress layer with a portion of the plurality of the silver ions in the antimicrobial bath to impart an antimicrobial property in the glass article.

In some embodiments, the step for removing a portion of the compressive stress layer is performed before the step for submersing the glass article in the antimicrobial bath. In other embodiments, the step for submersing the glass article in the antimicrobial bath is performed before the step for removing a portion of the compressive stress layer. Further, the antimicrobial bath can be maintained at a temperature of about 150° C. to about 450° C. in certain embodiments, and from about 200° C. to about 375° C. in other embodiments. Other embodiments require the step for submersing the glass article in the antimicrobial bath to be conducted for at least 15 minutes and no longer than about 10 hours; and, in some embodiments, this step is conducted for at least about 15 minutes and no longer than about 60 minutes.

According to a further embodiment, an antimicrobial glass article is provided. The glass article comprises a glass article having a first surface substantially free of strength-reducing defects; a compressive stress layer extending from the first surface of the glass article to a first selected depth in the glass article; and an antimicrobial region comprising a plurality of silver ions extending from the first surface to a depth of approximately 3 μm or less in the glass article. The first surface of the glass article has a concentration of silver ions that ranges from about 5% to about 70% or from about 20% to about 40% by weight.

In some embodiments, the first surface of the antimicrobial glass article is formed through a polishing treatment or an etching treatment.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
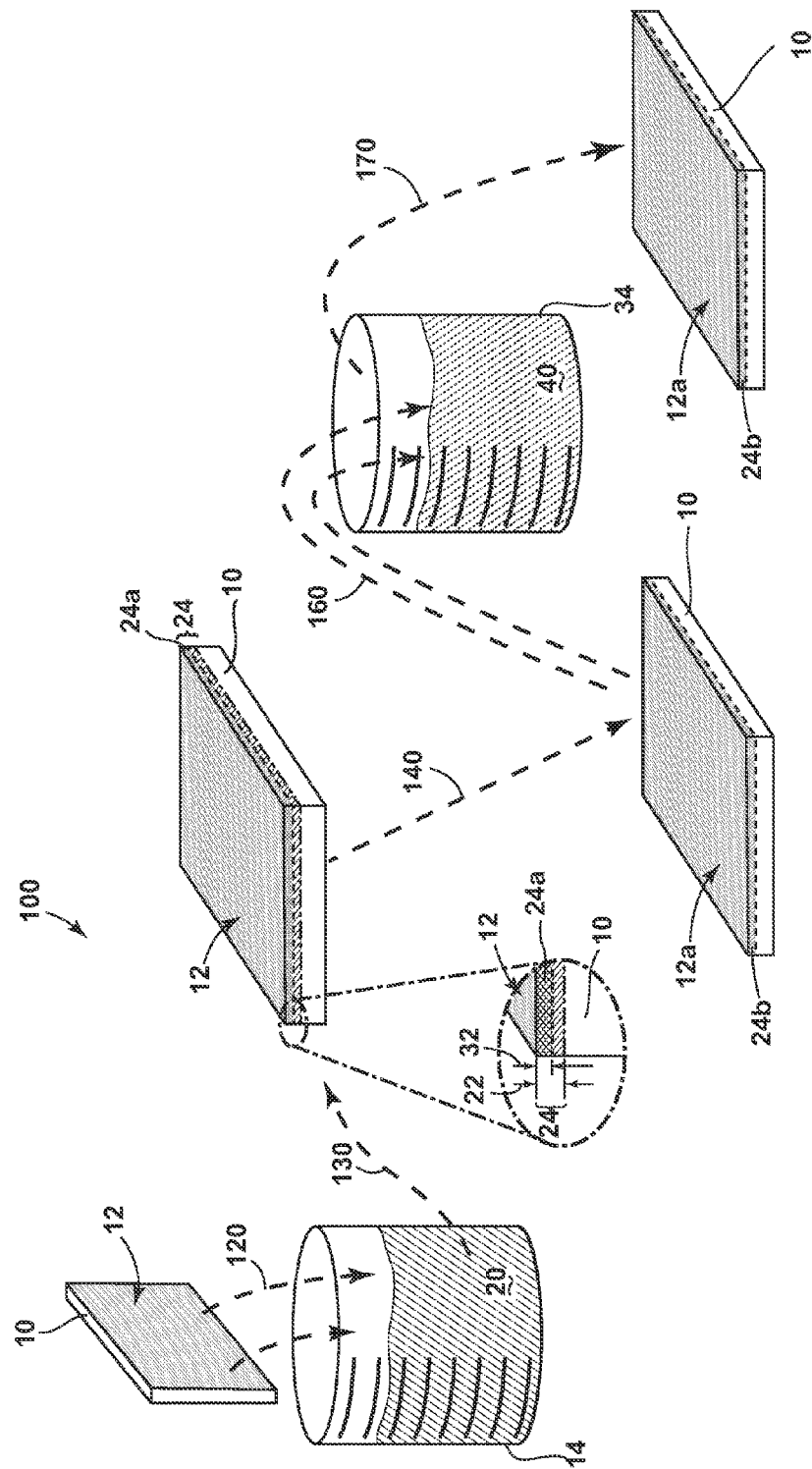
FIG. 1A is a schematic of a method of making an antimicrobial glass article according to one embodiment.

Reference will now be made in detail to the present preferred embodiments, examples of which are illustrated in the accompanying drawings. Whenever possible, the same reference numerals will be used throughout the drawings to refer to the same or like parts.

Discussed herein are new methods for making strengthened, antimicrobial glass articles. The methods generally involve the use of a dual-ion exchange process ("DIOX"). One ion exchange step is arranged to strengthen the glass article via exposure of the glass article to a first molten salt bath. The other step is configured to impart antimicrobial properties in the glass article via exposure of the glass article to a second molten salt bath.

It is believed that there are at least three mechanisms that may individually and/or interact to affect the overall strength of glass articles possessing strength enhancements and antimicrobial properties imparted through ion exchange processes. First, surface and bulk flaws existing in the as-produced glass article, and introduced during the ion exchange processes, can affect strength. Second, hydrogen diffusion into the surface of the glass article associated from the ion exchange processes can affect the overall strength level. Third, the compressive stress layer that develops from the ion exchanges processes also may impact the overall strength level. In addition, techniques for measuring stress levels as a function of depth in antimicrobial glass articles are outlined in U.S. Provisional Patent Application Nos. 61/835,823 and 61/860,560, hereby incorporated by reference.

In view of the foregoing mechanisms, methods for making glass articles with antimicrobial properties and strength enhancements have been developed. In some embodiments, methods for making such glass articles are provided that seek to minimize the quantity of $Ag^+$ ion precursors used in the process without significant detriment to antimicrobial properties. In other embodiments, methods for making glass articles with antimicrobial properties and strength enhancements are provided that increase the lifetime of the bath containing the $Ag^+$ ion precursors.

Referring to FIG. 1A, a method of making an antimicrobial glass article 100 is provided. In the method 100, a glass article 10 is employed having a first surface 12 and a plurality of ion-exchangeable metal ions. As shown in FIG. 1A, glass article 10 possesses other exterior surfaces in addition to first surface 12. In an exemplary embodiment, glass article 10 can comprise a silicate composition having ion-exchangeable metal ions. The metal ions are exchangeable in the sense that exposure of the glass article 10 and first surface 12 to a bath containing other metal ions can result in the exchange of some of the metal ions in the glass article 10 with metal ions from the bath. In one or more embodiments, a compressive stress is created by this ion exchange process in which a plurality of first metal ions in glass article 10, and specifically the first surface 12, are exchanged with a plurality of second metal ions (having an ionic radius larger than the plurality of first metal ions) so that a region of the glass article 10 comprises the plurality of the second metal ions. The presence of the larger second metal ions in this region creates the compressive stress in the region. The first metal ions may be alkali metal ions such as lithium, sodium, potassium, and rubidium. The second metal ions may be alkali metal ions such as sodium, potassium, rubidium, and cesium, with the proviso that the second alkali metal ion has an ionic radius greater than the ionic radius than the first alkali metal ion.

Glass article 10 can comprise various glass compositions. The choice of glass used for the glass article 10 is not limited to a particular composition, as antimicrobial properties can be obtained with enhanced strength using a variety of glass compositions. For example, the composition chosen can be any of a wide range of silicate, borosilicate, aluminosilicate, or boroaluminosilicate glass compositions, which optionally can comprise one or more alkali and/or alkaline earth modifiers.

By way of illustration, one family of compositions that may be employed in glass article 10 includes those having at least one of aluminum oxide or boron oxide and at least one of an alkali metal oxide or an alkali earth metal oxide, wherein −15 mol %≤($R_2O$+$R'O$−$Al_2O_3$−$ZrO_2$)−$B_2O_3$ 4 mol %, where R can be Li, Na, K, Rb, and/or Cs, and R' can be Mg, Ca, Sr, and/or Ba. One subset of this family of compositions includes from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. Such glasses are described more fully in U.S. patent application Ser. No. 12/277,573, hereby incorporated by reference in its entirety as if fully set forth below.

Another illustrative family of compositions that may be employed in glass article 10 includes those having at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σ alkali metal modifiers (mol %))]>1. One subset of this family includes from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. Such glasses are described in more fully in U.S. patent application Ser. No. 12/858,490, hereby incorporated by reference in its entirety as if fully set forth below.

Yet another illustrative family of compositions that may be employed in glass article 10 includes those having $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. One subset of this family of compositions includes from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$. Another subset of this family of compositions includes from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. Such glasses are described more fully in U.S. patent application Ser. No. 13/305,271, hereby incorporated by reference in its entirety as if fully set forth below.

Yet another illustrative family of compositions that can be employed in glass article 10 includes those having at least about 4 mol % $P_2O_5$, wherein ($M_2O_3$ (mol %)/$R_xO$ (mol %))<1, wherein $M_2O_3$=$Al_2O_3$+$B_2O_3$, and wherein $R_xO$ is the sum of monovalent and divalent cation oxides present in the glass. The monovalent and divalent cation oxides can be selected from the group consisting of $Li_2O$, $Na_2O$, $K_2O$, $Rb_2O$, $Cs_2O$, MgO, CaO, SrO, BaO, and ZnO. One subset of this family of compositions includes glasses having 0 mol % $B_2O_3$. Such glasses are more fully described in U.S. Provisional Patent Application No. 61/560,434, the content of which is hereby incorporated by reference in its entirety as if fully set forth below.

Still another illustrative family of compositions that can be employed in glass article 10 includes those having $Al_2O_3$, $B_2O_3$, alkali metal oxides, and contains boron cations having three-fold coordination. When ion exchanged, these glasses can have a Vickers crack initiation threshold of at least about 30 kilograms force (kgf). One subset of this family of compositions includes at least about 50 mol % $SiO_2$; at least about 10 mol % $R_2O$, wherein $R_2O$ comprises $Na_2O$; $Al_2O_3$, wherein −0.5 mol %≤$Al_2O_3$ (mol %)−$R_2O$ (mol %)≤2 mol %; and $B_2O_3$, and wherein $B_2O_3$ (mol %)−($R_2O$ (mol %)−$Al_2O_3$ (mol %))≥4.5 mol %. Another subset of this family of compositions includes at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0≤MgO+ZnO≤6 mol %; and, optionally, at least one of CaO, BaO, and SrO, wherein 0 mol %≤CaO+SrO+BaO≤2 mol %. Such glasses are more fully described in U.S. Provisional Patent Application No. 61/653,485, the content of which is incorporated herein by reference in its entirety as if fully set forth below.

The glass article 10 can adopt a variety of physical forms, including a glass substrate. That is, from a cross-sectional perspective, the glass article 10, when configured as a substrate, can be flat or planar, or it can be curved and/or sharply-bent. Similarly, glass article 10 can be a single unitary object, a multi-layered structure, or a laminate.

The glass article 10 may also be combined with a layer, such as a functional layer, disposed on a surface thereof. For example, the layer can include a reflection-resistant coating, a glare-resistant coating, a fingerprint-resistant coating, a smudge-resistant coating, a color-providing composition, an environmental barrier coating, or an electrically conductive coating.

Referring again to FIG. 1A, the method of making an antimicrobial glass article 100 employs a strengthening bath 20 contained within a vessel 14. The strengthening bath 20 contains a plurality of ion-exchanging metal ions. In some embodiments, for example, bath 20 may contain a plurality of potassium ions that are larger in size than ion-exchangeable ions, such as sodium, contained in the glass article 10. These ion-exchanging ions contained in the bath 20 will preferentially exchange with ion-exchangeable ions in the glass article 10 when the article 10 is submersed in the bath 20. In other embodiments, the strengthening bath 20 comprises a molten $KNO_3$ bath at a concentration approaching 100% with additives as understood by those with ordinary skill in the art or at a concentration of 100%, sufficiently heated to a temperature to ensure that the $KNO_3$ remains in a molten state during processing of the glass article 10. The strengthening bath may also include the combination of $KNO_3$ and one or both of $NaNO_3$ and $LiNO_3$.

Still referring to FIG. 1A, the method of making an antimicrobial glass article 100 depicted in FIG. 1A includes a step 120 for submersing the glass article 10 into the strengthening bath 20. Upon submersion into the bath 20, a portion of the plurality of the ion-exchangeable ions (e.g., $Na^+$ ions) in the glass article 10 are exchanged with a portion of the plurality of the ion-exchanging ions (e.g., $K^+$ ions) contained in the strengthening bath 20. According to some embodiments, the submersion step 120 is conducted for a predetermined time based on the composition of the bath 20, temperature of the bath 20, composition of the glass article 10 and/or the desired concentration of the ion-exchanging ions in the glass article 10.

After the submersion step 120 is completed, a washing step 130 is conducted to remove material from the bath 20 remaining on the surfaces of glass article 10, including the first surface 12. Deionized water, for example, can be used in the washing step 130 to remove material from the bath 20 on the surfaces of the glass article 10. Other media may also be employed for washing the surfaces of the glass article 10 provided that the media are selected to avoid any reactions with material from the bath 20 and/or the glass composition of the glass article 10.

As the ion-exchanging ions from the bath 20 are distributed into the glass article 10 at the expense of the ion-exchangeable ions originally in the glass article 10, a compressive stress layer 24 develops in the glass article 10. The compressive stress layer 24 extends from the first surface 12 to a diffusion depth 22 in the glass article 10. In general, an appreciable concentration of the ion-exchanging ions from the strengthening bath 20 (e.g., $K^+$ ions) exists in the compressive stress layer 24 after the submersion and cleaning steps 120 and 130, respectively. These ion-exchanging ions are generally larger than the ion-exchangeable ions (e.g., $Na^+$ ions), thereby increasing the compressive stress level in the layer 24 within the glass article 10. In addition, the amount of compressive stress ("CS") associated with the compressive stress layer 24 and the diffusion depth 22 can each be varied (by virtue of the conditions of the submersion step 120, for example) based on the intended use of the glass article 10. In some embodiments, the CS level in the compressive stress layer 24 and the diffusion depth 22 are controlled such that tensile stresses generated within the glass article 10 as a result of the compressive stress layer 24 do not become excessive to the point of rendering the glass article 10 frangible. In some embodiments, the CS level in the layer 24 may be about 200 MPa or greater. For example, the CS level in the layer 24 may be up to about 700 MPa, about 800 MPa, about 900 MPa, or even about 1000 MPa. The diffusion depth of the ion-exchanging ions and thus the layer 24 is often referred to as the depth of layer ("DOL") and may be about 15 µm or greater. In some instances, the DOL may be in the range from about 15 µm to about 50 µm, from about 20 µm to about 45 µm, or from about 30 µm to about 40 µm.

Referring again to FIG. 1A, the method of making an antimicrobial glass article 100 further includes a step 140 for removing a portion 24a of the compressive stress layer 24 from the first surface 12 of the glass article 10 to a first depth 32 above the diffusion depth 22 to define a new first surface 12a. That is, the removing step 140 removes material from the compressive stress layer 24 down to a first depth 32 such that a new surface 12a is formed in the glass article 10. Further, the removing step 140 that removes the portion 24a from the compressive stress layer 24 effectively creates a remaining compressive stress layer 24b in the glass article 10 that is defined by the new surface 12a and the diffusion depth 22.

In some embodiments of method 100, the removing step 140 is controlled such that material is removed from the glass article 10 to the first depth 32 at about 0.5 µm to about 2 µm from the first surface 12. In other embodiments of method 100, the removing step 140 is controlled such that material is removed from the glass article 10 to the first depth 32 at about 0.1 µm to about 2 µm from the first surface 12. The removing step 140 may also be controlled such that material is removed from the glass article 10 to the first depth 32 at about 0.2 µm, 0.3 µm, 0.4 µm, 0.5 µm, 0.6 µm, 0.7 µm, 0.8 µm, 0.9 µm, 1 µm, 1.1 µm, 1.2 µm, 1.3 µm, 1.4 µm, 1.5 µm, 1.6 µm, 1.7 µm, 1.8 µm, 1.9 µm, or 2 µm.

Various processes can be employed in the removing step 140 including but not limited to touch polishing, acid etching, and other types of material removal processes. Other material-removal processes may be employed as understood by those with ordinary skill in the art, provided that they are adapted to remove surface and bulk flaws in the glass without impacting optical clarity.

In some embodiments, the removing step 140 removes surface and bulk flaws preexisting within the compressive stress layer 24 from the manufacture of the glass article 10 and/or surface and bulk flaws created in the glass article 10 during the submersion step 120. In other embodiments, the removing step 140 can also remove and/or mitigate hydrogen that has diffused into the compressive stress layer 24 during the submersion step 120. Accordingly, the removing step 140 plays a role in enhancing the overall strength of the glass article 10, above and beyond strength enhancements obtained from the submersion step 120.

Referring again to FIG. 1A, the method of making an antimicrobial glass article 100 additionally employs an antimicrobial bath 40 contained in a vessel 34 that comprises a plurality of metal ions that can provide an antimicrobial effect. In some embodiments, the antimicrobial bath 40 includes a plurality of silver ions, each of which can provide an antimicrobial effect; a plurality of ion-exchangeable metal ions consistent with those present in the as-produced glass article 10; and a plurality of ion-exchanging ions consistent with those present in the strengthening bath 20. According to an exemplary embodiment, the bath 40 can possess a plurality of silver ions derived from molten $AgNO_3$ at a bath concentration of about 5% to 100% by weight. According to another exemplary embodiment, the bath 40 possesses a plurality of silver ions derived from molten $AgNO_3$ at a bath concentration of about 5% to about 50% by weight. In a further embodiment, the antimicrobial bath 40 comprises about 5% to about 50% by weight molten $AgNO_3$ with a balance of molten $KNO_3$ and $NaNO_3$. In an additional embodiment, the bath 40 possesses about 5% to up to 100% by weight molten $AgNO_3$ with a balance of molten $KNO_3$ and $NaNO_3$. The antimicrobial bath 40 can comprise a molten mixture of 50% $AgNO_3$ and 50% $KNO_3$+ $NaNO_3$ by weight.

According to some embodiments, the antimicrobial bath 40 can be set at a temperature ranging from about 150° C. to about 450° C. When antimicrobial bath 40 comprises molten $AgNO_3$ at a bath concentration of about 5% to about 50% by weight, bath 40 is preferably set at a temperature ranging from about 200° C. to about 375° C. In some embodiments of the method for making an antimicrobial glass article 100, the antimicrobial bath 40 is set at a temperature ranging from about 150° C. to about 275° C. and comprises 5% to up to 100% by weight molten $AgNO_3$ with a balance of molten $KNO_3$ and $NaNO_3$ (which may be in equal concentrations). In other embodiments of the method 100, the antimicrobial bath 40 is set at a temperature ranging from about 300° C. to about 375° C. and comprises 5% to about 50% by weight molten $AgNO_3$ with a balance of molten $KNO_3$ and $NaNO_3$ (which may be in equal concentrations).

Referring further to FIG. 1A, the method of making an antimicrobial glass article 100 also includes a step 160 for submersing the glass article 10 in the antimicrobial bath 40 to exchange a portion of the ion-exchangeable (e.g., $Na^+$ ions) and the ion-exchanging metal ions (e.g., $K^+$ ions) in the remaining compressive stress layer 24b with a portion of the plurality of silver metal ions in the antimicrobial bath 40 to impart an antimicrobial property in the glass article 10. The presence of the $KNO_3$ and/or $NaNO_3$ constituents in the bath 40 helps prevent a significant quantity of strength-enhancing $K^+$ ions from being removed from the remaining compressive stress layer 24b in the glass article 10 during the submersion step 160.

In some embodiments of method 100, the step 160 for submersing the glass article 10 in the antimicrobial bath 40 is controlled to a duration of at least approximately 15 minutes, sufficient to impart antimicrobial-imparting ions (e.g., $Ag^+$ ions) into the glass article 10 for the desired antimicrobial properties. According to some embodiments, $Ag^+$ ions are imparted into the new first surface 12a of the glass article 10 at a concentration of about 5% to about 70% by weight (by weight % of $Ag_2O$) in step 160, and about 5% to about 40% by weight in other embodiments. In further embodiments, $Ag^+$ ions are imparted into the new first surface 12a of the glass article 10 at a concentration of about 5%, 10%, 15%, 20%, 25%, 30%, 35%, or 40%. The duration of the step 160 is controlled based on the composition and temperature of bath 40, the composition of the glass article 10 and the desired antimicrobial properties associated with the remaining compressive layer 24b. In some embodiments, the duration of step 160 is controlled from about 15 minutes (e.g., about 20 minutes or greater, about 25 minutes or greater, about 30 minutes or greater, or about 35 minutes or greater) to about 10 hours. In other embodiments, the duration of step 160 is from about 15 minutes to about 60 minutes. In some additional embodiments of the method 100, step 160 is controlled to a duration of about 25 minutes to about 35 minutes.

After the submersion step 160 is completed, a washing step 170 is conducted to remove material from the bath 40 remaining on the surfaces of glass article 10, including first surface 12. Deionized water, for example, can be used in the washing step 170 to remove material from the bath 40 on the surfaces of the glass article 10. Other media may also be employed for washing the surfaces of the glass article 10 provided that the media is selected to avoid any reactions with material from the bath 40 and/or the glass composition of the glass article 10.

The method of making an antimicrobial glass article 100 depicted in FIG. 1A can be advantageous in the sense that the material removal step, e.g., removing step 140, is employed before the introduction of $Ag^+$ ions in subsequent steps. Accordingly, the $Ag^+$ ions incorporated into the glass article 10 during the submersion step 160 are not affected by the removing step 140, thus preserving the Ag material incorporated into the articles. In some embodiments of the method 100, submersion step 160 is configured to ensure that $Ag^+$ ions are imparted into the glass article 10 to a depth of 1 μm, or to 2 μm in some cases, with a concentration profile indicative of a high concentration of $Ag^+$ ions (e.g., 20 to 40% by weight % of $Ag_2O$) at the first surface 12a.

Figure 1B:
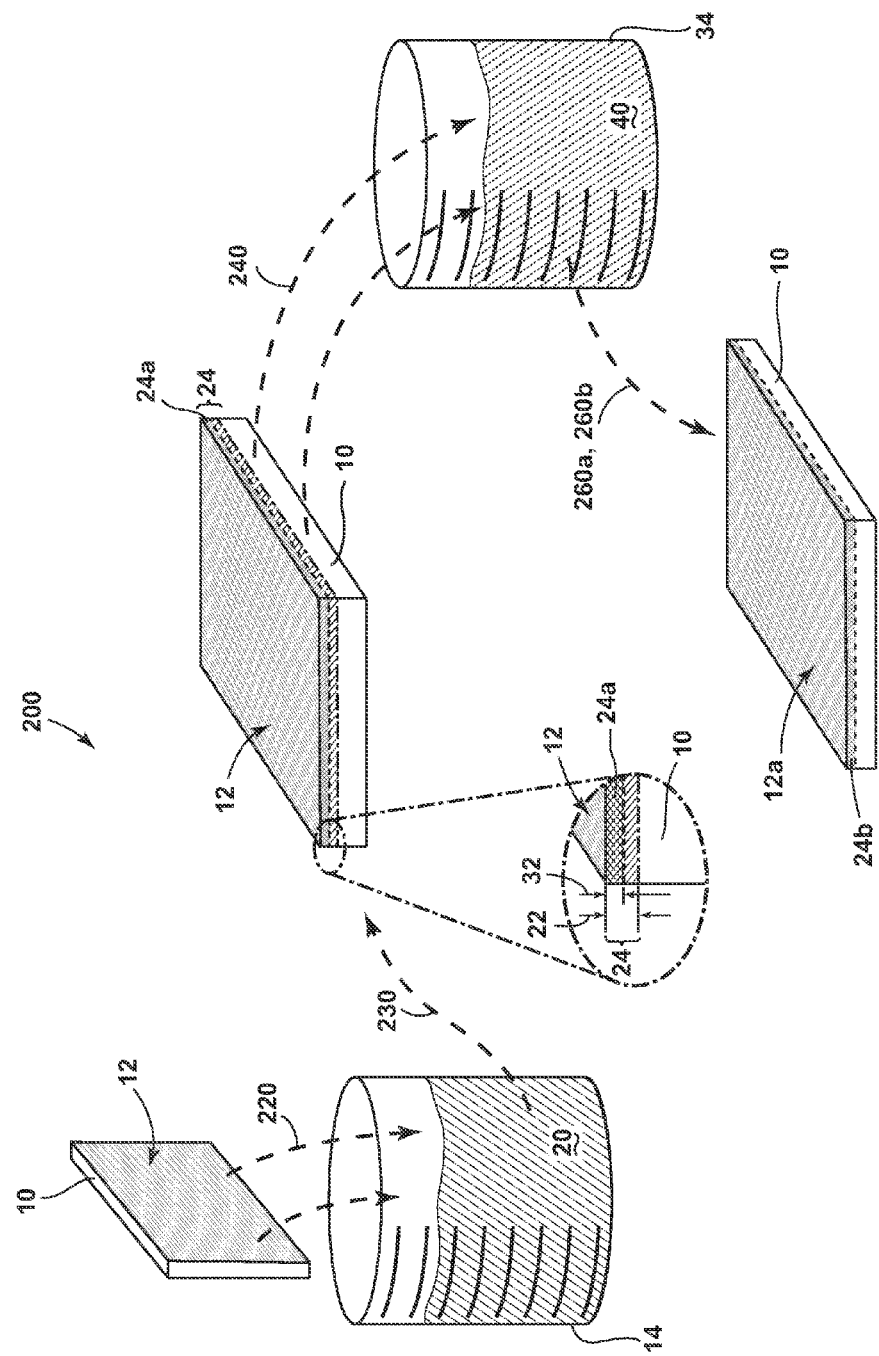
FIG. 1B is a schematic of a method of making an antimicrobial glass article according to another embodiment.

Referring to FIG. 1B, another method of making an antimicrobial glass article 200 is provided. The method 200 is similar in many respects to the foregoing method 100 and, in some cases, identically numbered elements are employed. Unless otherwise stated in the following, the like-numbered elements in FIGS. 1B and 1n the following discussion have the same structure and/or function as those described earlier in connection with method 100 depicted in FIG. 1A. In the method 200, a glass article 10 is provided having a first surface 12 and a plurality of ion-exchangeable metal ions. As shown in FIG. 1B, the glass article 10 possesses other exterior surfaces in addition to the first surface 12.

Still referring to FIG. 1B, the method 200 includes a step 220 for submersing the glass article 10 into the strengthening bath 20. Upon submersion into the bath 20, a portion of the plurality of the ion-exchangeable ions (e.g., $Na^+$ ions) in the glass article 10 are exchanged with a portion of the plurality of the ion-exchanging ions (e.g., $K^+$ ions) contained in the strengthening bath 20. In the method 200, the step 220 for submersing the glass article 10 is substantially identical to the step 120 employed in the method 100.

After the submersion step 220 is completed, a washing step 230 is conducted to remove material from the bath 20 remaining on the surfaces of glass article 10, including the first surface 12. In the method 200, the step 230 for washing the glass article 10 is substantially identical to the step 130 employed in the method 100.

Referring again to FIG. 1B, the method of making an antimicrobial glass article 200 also includes a step 240 for submersing the glass article 10 in the antimicrobial bath 40 to exchange a portion of the ion-exchangeable (e.g., $Na^+$ ions) and the ion-exchanging metal ions (e.g., $K^+$ ions) in the compressive stress layer 24 with a portion of the plurality of silver metal ions in the antimicrobial bath 40 to impart an antimicrobial property in the glass article 10. The presence of the $KNO_3$ and $NaNO_3$ constituents in the bath 40 helps prevent a significant quantity of strength-enhancing $K^+$ ions from being removed from the compressive stress layer 24 in the glass article 10 during the submersion step 240.

In some embodiments of method 200, the step 240 for submersing the glass article 10 in the antimicrobial bath 40 is controlled to a duration of at least approximately 15 minutes, sufficient to impart antimicrobial-imparting ions (e.g., $Ag^+$ ions) into the glass article 10 for the desired antimicrobial properties. The duration of the step 240 is controlled based on the composition and temperature of bath 40, the composition of the glass article 10, and the desired antimicrobial properties associated with the remaining compressive layer 24b (created at step 260b).

In contrast to the method 100, the method 200 depicted in FIG. 1B does not typically rely on a material removal step between the submersion steps 220 and 240. As no material removal processes have taken place in method 200 before or during step 240, the duration of step 240 can be adjusted to longer durations (compared to those employed in step 160 of the method 100) to ensure sufficient diffusion depths for the metal ions, e.g., $Ag^+$, that impart antimicrobial properties in the glass article 10. These longer durations can be needed given that a portion of these metal ions may be removed during a subsequent material removal process (e.g., removal step 260b). In some embodiments, the antimicrobial bath 40 is set at a higher temperature in step 240, e.g., between 200° C. and 400° C. (as compared to the bath 40 employed in the submersion step 160 of method 100), to ensure that diffusion depths for the metal ions in bath 40 exchanged in the glass article 10 have been developed that are sufficient for the purpose of imparting an antimicrobial property to the article. In particular, these diffusion depths must be sufficiently deep to accommodate the subsequent material removal process (e.g., material removing step 260b) that occurs after the submersion steps 220 and 240. Accordingly, in some other embodiments, the antimicrobial bath 40 is set at a temperature between 300° C. and 400° C. in step 240. Furthermore, the duration of step 240 can be controlled from about 15 minutes (e.g., about 20 minutes or greater, about 25 minutes or greater, about 30 minutes or greater, or about 35 minutes or greater) to about 10 hours. In other embodiments, the duration of step 240 is from about 15 minutes to about 90 minutes. In some additional embodiments of the method 200, step 240 is controlled to a duration of about 15 minutes to about 25 minutes.

According to some embodiments, $Ag^+$ ions are imparted into the first surface 12 of the glass article 10 at a concentration of about 5% to about 70% by weight (by weight % of $Ag_2O$) in step 240, and about 5% to about 40% by weight in other embodiments. In further embodiments, $Ag^+$ ions are imparted into the first surface 12 of the glass article 10 at a concentration of about 5%, 10%, 15%, 20%, 25%, 30%, 35%, or 40%. Given the subsequent material removal processes (see the following description of 260b), relatively high concentrations of $Ag^+$ at a depth that may reach 3 µm and, in some cases, exceed 3 µm (i.e., as measured from the first surface 12 of the glass article 1) can be advantageous, with a concentration of $Ag^+$ ions at the first surface 12 that ranges from about 20% by weight to about 40% by weight $Ag_2O$. Although the quantity of $Ag^+$ ions employed in these embodiments of method 200 may be higher than those compared to some embodiments of method 100 (and thus result in higher manufacturing costs), one advantage of employing $Ag^+$ ions at a greater depth is that the resulting glass article can have less sensitivity to down-stream substrate processing steps (e.g., heat treatments, deposition of functional layers, etc.). For example, having $Ag^+$ ions at a greater depth in the glass article 10 can lessen the effects of $Ag^+$ ion diffusion that could result from subsequent downstream processing of the article 10 above ambient temperatures (e.g., 180° C. and greater).

After the submersion step 240 is completed in method 200 (see FIG. 1B), a washing step 260a is conducted to remove material from the bath 40 remaining on the surfaces of glass article 10, including first surface 12. Deionized water, for example, can be used in the washing step 260a to remove material from the bath 40 on the surfaces of the glass article 10. Other media may also be employed for washing the surfaces of the glass article 10 provided that the media is selected to avoid any reactions with material from the bath 40 and/or the glass composition of the glass article 10.

Referring again to FIG. 1B, the method of making an antimicrobial glass article 200 further includes a removing step 260b for removing a portion 24a of the compressive stress layer 24. That is, material is removed from the first surface 12 of the glass article 10 in step 260b to a first depth 32 above the diffusion depth 22, thus defining a new first surface 12a. Accordingly, the removing step 260b (comparable to the removing step 140 of method 100 described in connection with FIG. 1A) removes material from the compressive stress layer 24 down to the first depth 32 such that the new surface 12a is formed in the glass article 10. Further, the removing step 260b that removes the portion 24a from the compressive stress layer 24 effectively creates a remaining compressive stress layer 24b in the glass article 10 that is defined by the new surface 12a and the diffusion depth 22.

In some embodiments of method 200, the removing step 260b is controlled such that material is removed from the glass article 10 to the first depth 32 at about 0.5 µm to about 2 µm from the first surface 12. In other embodiments of method 200, the removing step 260b is controlled such that material is removed from the glass article 10 to the first depth 32 at about 0.1 µm to about 2 µm from the first surface 12. The removing step 260b may also be controlled such that material is removed from the glass article 10 to the first depth 32 at about 0.2 µm, 0.3 µm, 0.4 µm, 0.5 µm, 0.6 µm, 0.7 µm, 0.8 µm, 0.9 µm, 1 µm, 1.1 µm, 1.2 µm, 1.3 µm, 1.4 µm, 1.5 µm, 1.6 µm, 1.7 µm, 1.8 µm, 1.9 µm, or 2 µm.

Various processes can be employed in the removing step 260 including but not limited to touch polishing, acid etching, and other types of material removal processes. Other material-removal processes may be employed as understood by those with ordinary skill in the art, provided that they are adapted to remove surface and bulk flaws in the glass without impacting optical clarity.

In some embodiments, the removing step 260b removes surface and bulk flaws preexisting within the compressive stress layer 24 from the manufacture of the glass article 10 and/or surface and bulk flaws created in the glass article 10 during the submersion step 240. In other embodiments, the removing step 260b can remove and/or mitigate hydrogen that has diffused into the compressive stress layer 24 during the submersion step 240. In general, the removing step 260b is controlled to the first depth 32 sufficient to remove flaws and diffused hydrogen in the compressive stress layer 24 to enhance the strength of glass article 10. At the same time, removing step 260b is conducted to minimize the removal of the exchanged ions (e.g., $Ag^+$ ions) imparted during the submersion step 240 for the development of antimicrobial properties. As such, it is important to ensure that sufficient levels of exchanged ions for antimicrobial properties are imparted into the glass article 10 during the submersion step 240 to a diffusion depth below the level that will subsequently be removed during the removing step 260b. The removing step 260b thus plays a role in enhancing the overall strength of the glass article 10, above and beyond the strength enhancements obtained from the submersion step 220.

In some embodiments of method 200, it is also possible to conduct a portion of the removing step 260b before the submersion step 240, and then finish the remainder of the removing step 260b after the submersion step 240 has been completed. As such, method 200 will then include portions of removing step 260b executed before and after the submersion step 240. One advantage to dividing the removing step 260b into two stages is that it allows for additional process flexibility to account for maximizing both antimicrobial efficacy and mechanical properties in the final antimicrobial glass article, particularly in view of down-stream processing conditions. For example, a deeper diffusion depth for the antimicrobial agents imparted during the submersion step 240 may be necessary when a portion of the material removing step 260b is conducted prior to the submersion step 240.

According to the methods 100, 200, the antimicrobial activity and efficacy obtained in the glass article 10 through steps 160, 240 can be quite high. The antimicrobial activity and efficacy can be measured in accordance with Japanese Industrial Standard JIS Z 2801 (2000), entitled "Antimicrobial Products Test for Antimicrobial Activity and Efficacy," the content of which is hereby incorporated by reference in its entirety as if fully set forth below. Under the "wet" conditions of this test (i.e., about 37° C. and greater than 90% humidity for about 24 hours), it is believed that the antimicrobial glass articles fabricated according to the methods described herein can exhibit at least a five log reduction (i.e., LR>~5 in the concentration (or a kill rate of 99.999%) of at least *Staphylococcus aureus*, *Enterobacter aerogenes*, and *Pseudomonas aeruginosa* bacteria. According to other embodiments, glass articles 10 fabricated according to the methods 100, 200 described herein can exhibit at least a two log reduction (i.e., LR>~2) in the concentration (or kill rate of 99%) of at least *Staphylococcus aureus, Enterobacter aerogenes*, and *Pseudomonas aeruginosa* bacteria when tested according to the protocol described in U.S. Provisional Patent Application No. 61/908,401, which is hereby incorporated by reference in its entirety as if fully set forth below.

In scenarios where the wet testing conditions of JIS Z 2801 do not reflect actual use conditions for the antimicrobial glass articles 10 described herein (e.g., when the glass articles are used in electronic devices, or the like), the antimicrobial activity and efficacy can be measured using "drier" conditions. For example, the glass articles can be tested between about 23 and about 37° C. and at about 38 to 42% humidity for about 24 hours. Specifically, 5 control samples and 5 test samples can be used, wherein each sample has a specific inoculum composition and volume applied thereto, with a sterile coverslip applied to the inoculated samples to ensure uniform spreading on a known surface area. The covered samples can be incubated under the conditions described above, dried for about 6 to about 24 hours, rinsed with a buffer solution, and enumerated by culturing on an agar plate, the last two steps of which are similar to the procedure employed in the JIS Z 2801 test. Using this test, it is believed that the antimicrobial glass articles 10, fabricated according to the methods 100, 200, described herein can exhibit at least a one log reduction (i.e., LR>~1 in the concentration (or a kill rate of 90%) of at least *Staphylococcus aureus* bacteria and at least a two log reduction (i.e., LR>~2 in the concentration (or a kill rate of 99.99) of at least *Enterobacter aerogenes*, and *Pseudomonas aeruginosa* bacterial. In other implementations, it is believed that the antimicrobial glass articles 10 described herein can exhibit at least a three log reduction (i.e., LR>~3 in the concentration of any bacteria to which it is exposed under these testing conditions.

More generally, glass articles 10 fabricated according to the methods 100, 200 described herein have exceptional antimicrobial properties with enhanced strength levels consistent with or higher than that exhibited by Corning® Gorilla® glass. These glass articles 10 also are produced according to the methods 100, 200 at relatively low cost due to the shallow levels of $Ag^+$ ions imparted in the articles 10 at steps 160, 240 given the relatively low temperatures of the antimicrobial bath 40. Another benefit of the relatively low temperatures of bath 40, particularly when molten $AgNO_3$ salt is employed as an $Ag^+$ precursor, is the expected increase in the life of the bath 40 from a reduced degree of $AgNO_3$ decomposition. A further advantage of glass articles 10 produced according to methods 100, 200 is their improved optical properties relative to conventional antimicrobial glasses by virtue of their lower amounts of $Ag^+$ ions contained at the surfaces of these articles.

Figure 2:
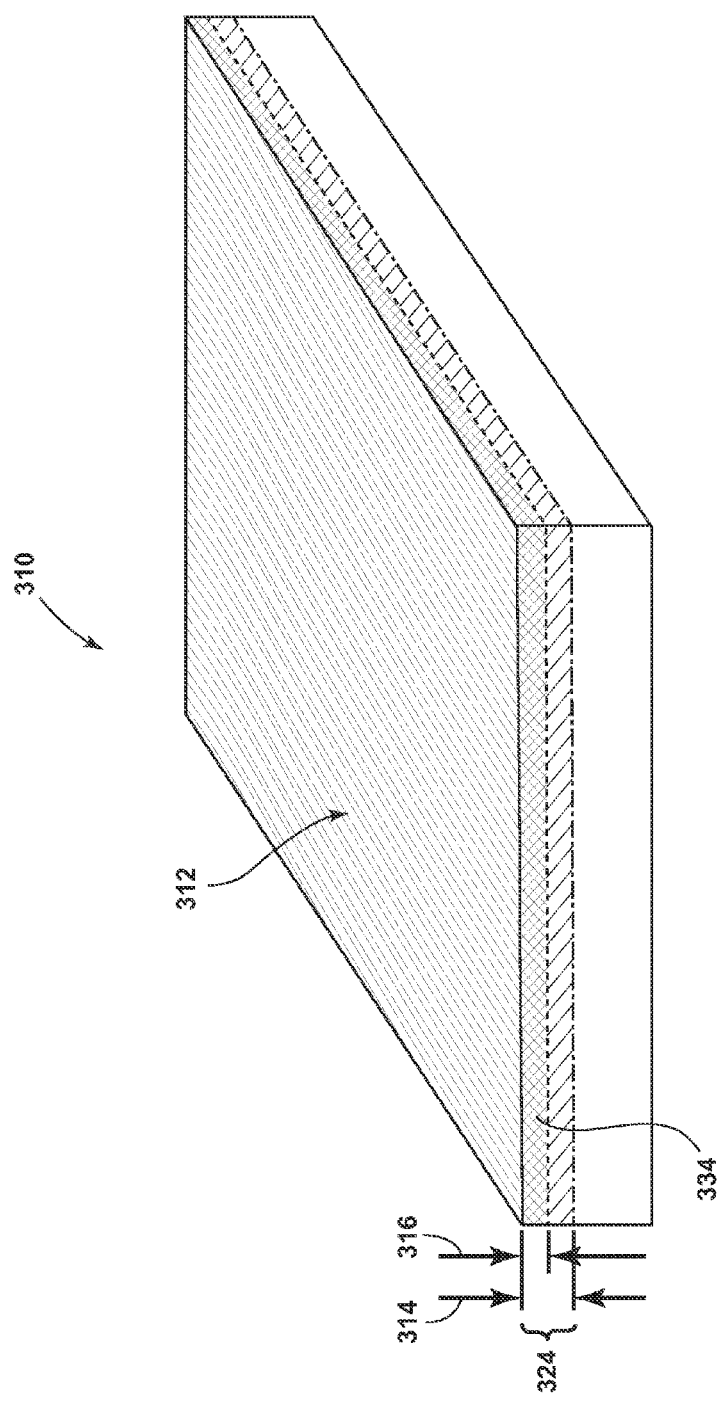
FIG. 2 is a schematic of an antimicrobial glass article according to a further embodiment.

As depicted in FIG. 2, an antimicrobial glass article 310 is provided according to a further embodiment. The glass article 310 comprises a first surface 312 that is substantially free of strength-reducing defects. In some embodiments, the first surface 312 is substantially free of hydrogen as measured by Secondary Ion Mass Spectrometry ("SIMS"). In other embodiments, a surface region of the glass article 310 between the first surface 312 and about 0.5 μm in depth is substantially free of hydrogen penetration. As used herein, the phrase "substantially free of hydrogen penetration" includes a hydrogen penetration as measured by SIMS techniques of about 1000 counts/second or less. In more specific embodiments, a surface region between about 0.1 μm to about 0.5 μm in depth from the first surface 312 is substantially free of hydrogen penetration. Further, glass article 310 includes a compressive stress layer 324 that extends from the first surface 312 of the glass article 310 to a first selected depth 314.

The glass article 310 also comprises an antimicrobial region 334 comprising a plurality of silver ions extending from the first surface 312 to an antimicrobial depth 316. The first surface 312 of the glass article 310 has a concentration of silver ions that ranges from about 5% to about 70% by weight. In other embodiments, the first surface 312 has a concentration of silver ions that ranges from about 5% to about 40% by weight. In some exemplary embodiments, the antimicrobial depth 316 is set at approximately 3 μm or less, about 2 μm or less, or about 1 μm or less in the glass article 310. In an additional embodiment, the antimicrobial depth 316 is set at approximately 0.1 μm to approximately 3 μm. It should also be understood that, in some embodiments, one or more $Ag^+$ ions may be present in the glass article 310 to a depth below the antimicrobial depth 316 (outside of the antimicrobial region 334) at antimicrobial levels that are not readily measurable and/or a substantial contributor to the antimicrobial efficacy of the article 310. Any such $Ag^+$ ions existing in the glass article 310 deeper than the antimicrobial depth 316, and extending to a residual antimicrobial depth, define a residual antimicrobial region that, in some embodiments, may provide a contribution to the antimicrobial efficacy of the article 310. Conceivably, the residual antimicrobial depth could extend through the full thickness of the article 310.

Antimicrobial glass article 310 can be fabricated according to the methods 100, 200 outlined in the foregoing description. Antimicrobial glass articles 310 may also be fabricated according to protocols that are modified consistent with the methods 100, 200 as outlined in the foregoing. In some embodiments of antimicrobial glass article 310, the first surface 312 is formed by a material removal process, e.g., touch polishing or acid etching treatments. In another embodiment, the first surface 312 is characterized by a surface morphology consistent with the removal of about 0.1 μm to about 2 μm from a touch polishing or acid etching surface treatment process. According to another embodiment, the compressive layer 324 contains a plurality of metal ions (e.g., $K^+$ ions) that have been exchanged and/or imparted into the glass article 310 that contains smaller ion-exchangeable ions (e.g., $Na^+$ ions). It is further possible to construct antimicrobial glass article 310 such that the first surface 312 contains a concentration of $Ag^+$ ions that ranges from about 20% to about 40% by weight. Preferably, the first surface 312 contains a concentration of $Ag^+$ ions that ranges from about 30% to about 40% by weight.

Figure 3:
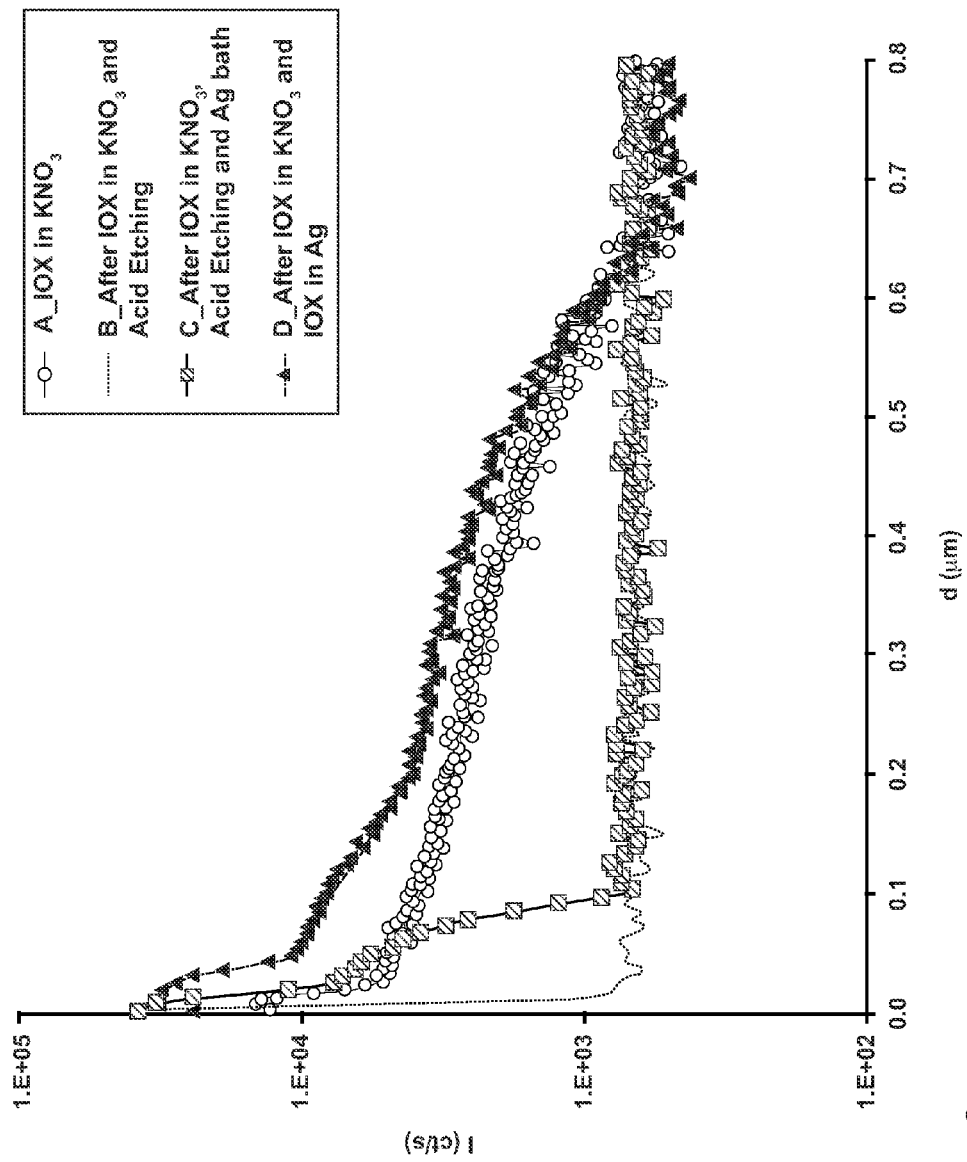
FIG. 3 is a plot of hydrogen penetration in glass articles processed according to various ion exchange and surface treatment processes according to an embodiment.

Referring to FIG. 3, hydrogen penetration in glass articles processed according to various ion exchange and surface treatment processes are depicted according to an embodiment of this disclosure. The glass articles employed to generate the results depicted in FIG. 3 were supplied by Corning Incorporated and had a thickness of ~0.7 mm. These glass articles comprised an aluminosilicate glass composition including from 7 mol % to 26 mol % $Al_2O_3$; from 0 mol % to 9 mol % $B_2O_3$; from 11 mol % to 25 mol % $Na_2O$; from 0 mol % to 2.5 mol % $K_2O$; from 0 mol % to 8.5 mol % MgO; and from 0 mol % to 1.5 mol % CaO. Hydrogen penetration data obtained from SIMS in terms of counts/second versus depth (in μm) are plotted in FIG. 3. Data set "A" corresponds to glass articles submersed only in a strengthening bath with $KNO_3$ (e.g., step 120 shown in FIG. 1A). Data set "B" corresponds to glass articles processed in a fashion comparable to the "A" set, and subjected to a material removal step comparable to step 140 (see FIG. 1A). Data set "C" corresponds to glass articles processed according to the "B" set, and further submersed in an antimicrobial bath comparable to step 160 (see FIG. 1A). Finally, data set "D" corresponds to glass articles submersed in a strengthening bath, followed by an antimicrobial bath, with no material removal step.

As demonstrated by FIG. 3, hydrogen penetration and diffusion levels were the highest in the "A" and "D" sets to an approximate depth of 7 µm, likely associated with hydrogen introduced during the submersion steps 120 and 160 in the strengthening and antimicrobial baths, respectively. On the other hand, material removal steps were executed after a strengthening bath submersion, and after an antimicrobial bath submersion, during the processing of the "B" and "C" samples, respectively. In particular, the surface levels of hydrogen diffusion in the glass articles of the "B" and "C" sets were reduced. In effect, the material removal step 140 can "cut off" a portion of the curves associated with the "A" and "D" sets in removing the surface of the substrate (e.g., a few microns from the surface) that contains relatively high hydrogen concentration levels.

Figure 4:
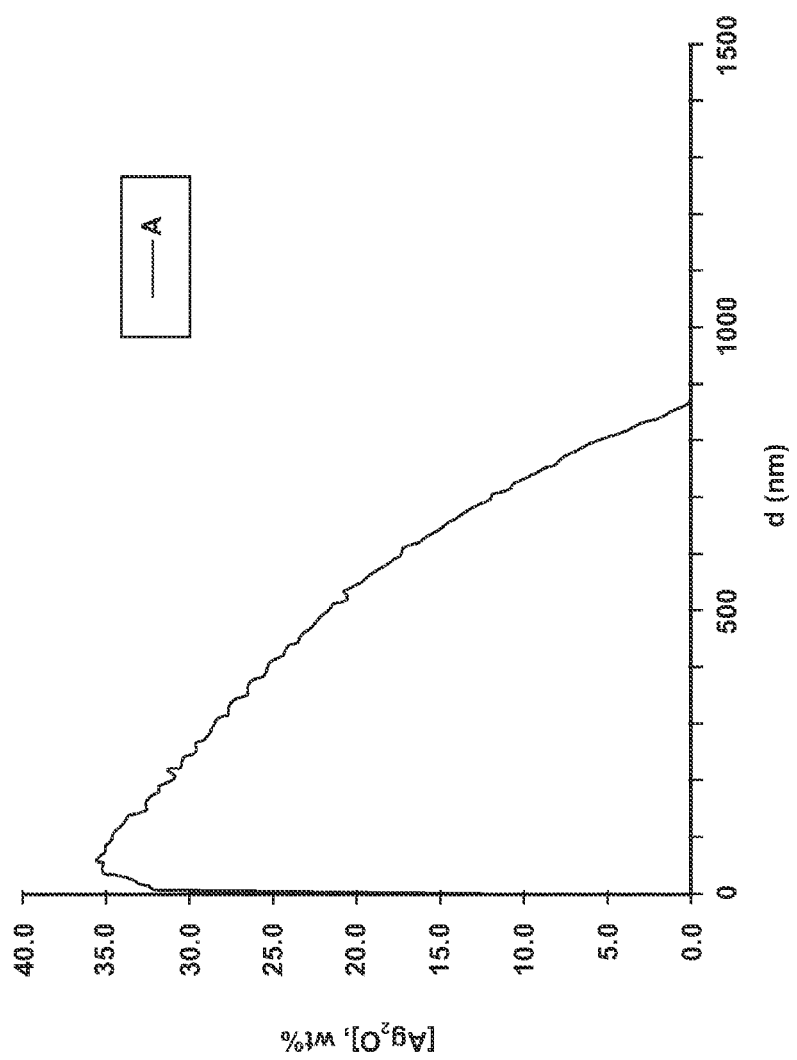
FIG. 4 is a plot of $Ag^+$ ion concentration as a function of depth in a strengthened glass article further processed with a 50% $AgNO_3$ and 50% $KNO_3+NaNO_3$ molten salt bath according to another embodiment.

Referring to FIG. 4, $Ag^+$ ion concentration (in $Ag_2O$ weight %) is plotted as a function of depth (in nm) in a strengthened glass article further processed with a 50% $AgNO_3$ and 50% $KNO_3+NaNO_3$ molten salt bath at 250° C. for 30 minutes (i.e., the "A" data set) according to another embodiment. The composition and thickness of the glass article employed to generate the data depicted in FIG. 4 are the same as the composition and thickness of the articles employed in the testing associated with FIG. 3. The $Ag^+$ ion concentration level data presented in FIG. 4 are derived from SIMS testing. As demonstrated by FIG. 4, a relatively low temperature antimicrobial bath submersion step (see, e.g., steps 160 and 240 depicted in FIGS. 1A and 1B) can be employed to generate $Ag^+$ ion concentrations that approach 35% near the surface of the glass article (e.g., glass article 10) and appreciable $Ag^+$ levels to a depth approaching 1000 µm (~1 µm).

Figure 5:
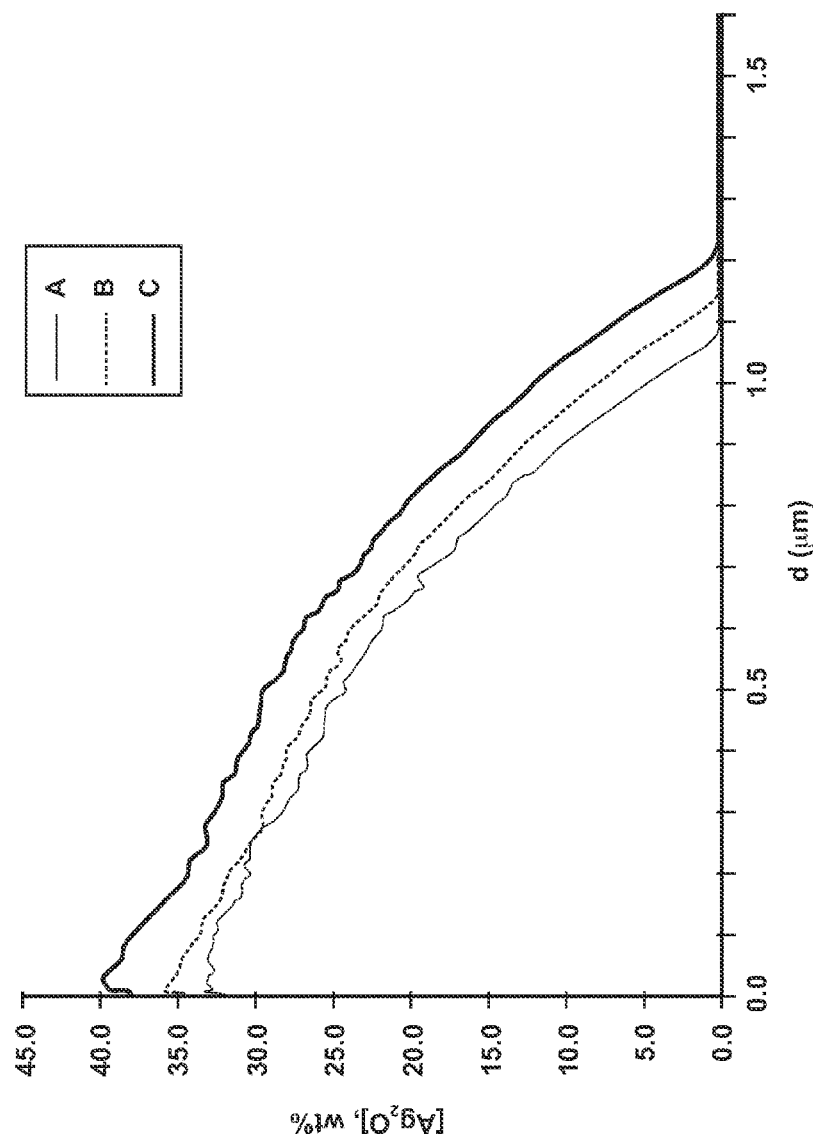
FIG. 5 is a plot of $Ag^+$ ion concentration as a function of depth in glass articles processed with 50%, 70% and 100% $AgNO_3$ molten salt baths having a balance of $KNO_3+NaNO_3$ according to a further embodiment.

In FIG. 5, the results from another experiment are presented, depicting $Ag^+$ ion concentration as a function of depth (in µm) in glass articles (e.g., glass article 10) processed with 50%, 70%, and 100% $AgNO_3$ molten salt baths having a balance of $KNO_3+NaNO_3$ at a temperature of 250° C. for 30 minutes (i.e., the "A", "B" and "C" data sets, respectively) according to a further embodiment. The composition and thickness of the glass articles employed to generate the data depicted in FIG. 5 are the same as the composition and thickness of the articles employed in the testing associated with FIG. 4. Further, the results shown in FIG. 5 are comparable to those depicted in FIG. 4 insofar as $Ag^+$ ion concentrations approach and exceed 35% near the surface of the glass article and appreciable $Ag^+$ levels are obtained to a depth approaching and surpassing 1000 µm (~1 µm). The data also suggests that a threshold concentration of $Ag^+$ ions of 40% can be obtained at the surface of the glass article when a 100% $AgNO_3$ molten salt bath is employed. Hence, significant increases in the concentration of the $Ag^+$ in the antimicrobial bath have only a marginal effect on the $Ag^+$ ion concentrations obtained at the surface of the glass articles. Accordingly, antimicrobial baths containing only 50% $AgNO_3$ or less are necessary to obtain meaningful $Ag^+$ ion concentrations at the surface of the glass article.

Figure 6:
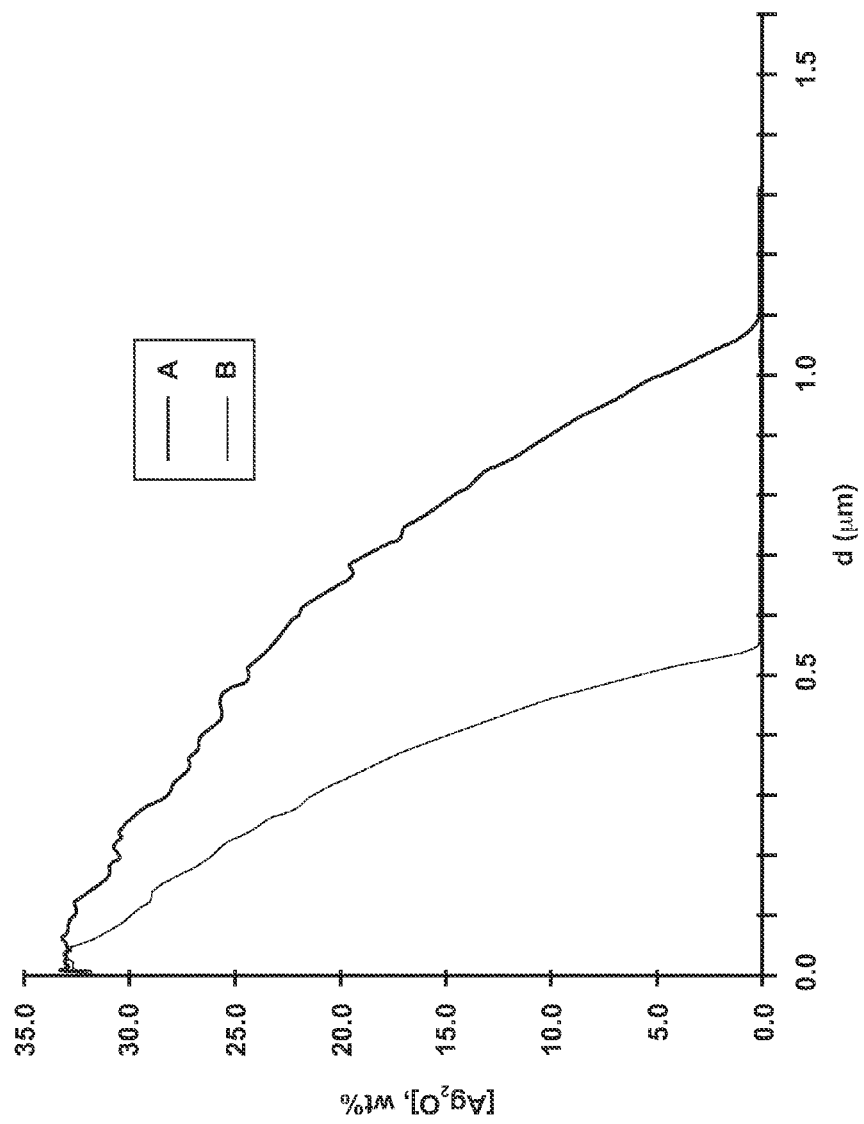
FIG. 6 is a plot of $Ag^+$ ion concentration as a function of depth in glass articles submersed for 8.5 and 30 minutes in a 50% $AgNO_3$ molten salt bath having a balance of $KNO_3+NaNO_3$ according to an additional embodiment.

A plot of $Ag^+$ ion concentration as a function of depth (in µm) for glass articles (e.g., glass article 10) submersed in a 50% $AgNO_3$ molten salt bath having a balance of $KNO_3+NaNO_3$ is depicted in FIG. 6 according to an additional embodiment. In this experiment, the 50% $AgNO_3$ bath was set at a temperature of 250° C. and the submersion steps were conducted for 8.5 minutes and 30 minutes for data sets "A" and "B," respectively. The composition and thickness of the glass articles employed to generate the data depicted in FIG. 6 are the same as the composition and thickness of the articles employed in the testing associated with FIG. 5. Here, the data shows that $Ag^+$ ion diffusion depth is fairly sensitive to submersion duration whereas as the surface concentration is not as sensitive. In particular, the $Ag^+$ ion concentration levels exceed 30% at the surface of these glass articles for both data sets, whereas the diffusion depths were about 0.5 µm and 1.0 µm for the "A" and "B" data sets, respectively.

Figure 7:
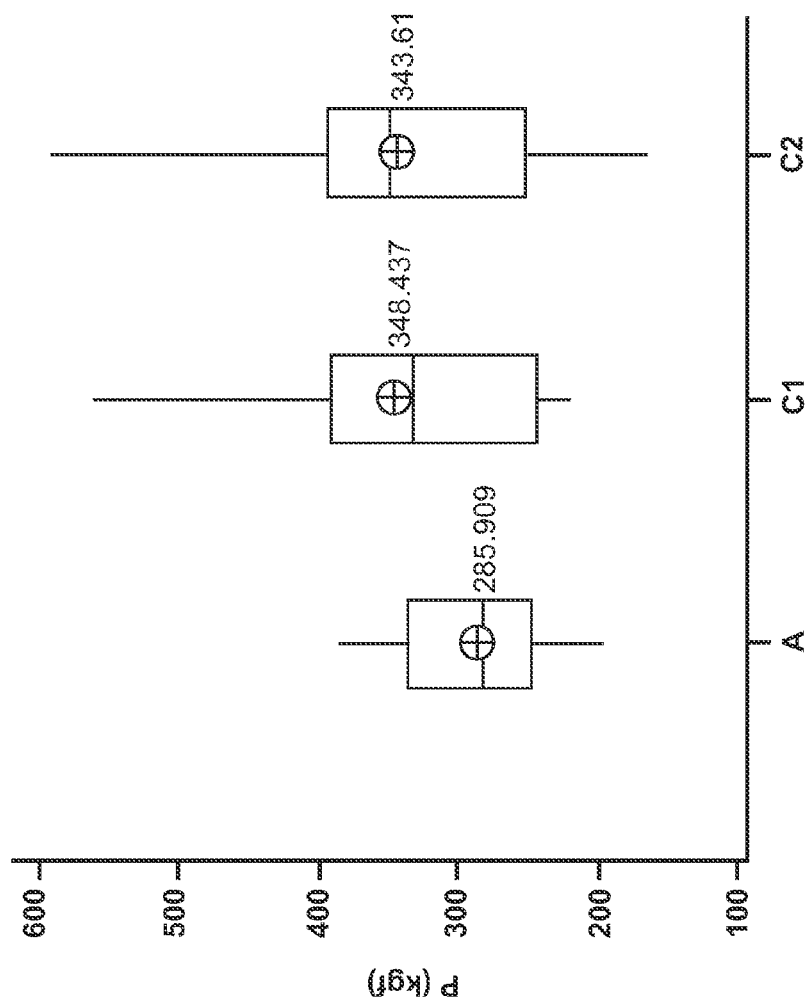
FIG. 7 is box plot depicting the results from Ring-on-Ring ("ROR") testing of glass articles processed according to various ion exchange processes, with and without an acid etching step, according to another embodiment.

Referring to FIG. 7, a box plot is presented that depicts the results from ROR strength testing of glass articles processed according to various ion exchange and surface treatment processes according to another embodiment. The composition and thickness of the glass articles employed to generate the data depicted in FIG. 7 are the same as the attributes of the articles employed in the testing associated with FIG. 6. In particular, the glass articles were supplied by Corning Incorporated and had an aluminosilicate glass composition including from 7 mol % to 26 mol % $Al_2O_3$; from 0 mol % to 9 mol % $B_2O_3$; from 11 mol % to 25 mol % $Na_2O$; from 0 mol % to 2.5 mol % $K_2O$; from 0 mol % to 8.5 mol % MgO; and from 0 mol % to 1.5 mol % CaO. The ROR tests were generally performed according to the ASTM C-1499-03 standard test method for Monotonic Equibiaxial Flexural Strength of Advanced Ceramics at Ambient Temperatures, with a few modifications to test fixtures and test conditions as outlined in U.S. Patent Publication No. 2013/0045375, at [0027], incorporated by reference herein. Note that the samples tested to generate the data depicted in FIG. 7 were not abraded prior to ROR testing.

In FIG. 7, the "A" data set corresponds to glass articles ROR tested after only an ion-exchange strengthening process (e.g., comparable to step 120 shown in FIG. 1A), with no further material removal or antimicrobial bath submersion steps. The "C1" and "C2" data sets correspond to two batches of glass articles ROR tested after being subjected to ion-exchange strengthening and $Ag^+$ ion antimicrobial bath submersion steps (e.g., comparable to steps 120 and 160 shown in FIG. 1A), along with a material removal step employing acid etching (e.g., comparable to step 140 shown in FIG. 1A) between the bath submersion steps. The acid etching was conducted using a solution of 1.45M HF acid and 0.9M $H_2SO_4$ acid at room temperature for about 97 seconds to obtain a material removal depth of approximately 1.4 µm with a vertical static dipping etching arrangement. Also note that the glass articles associated with the "C1" and "C2" data sets in FIG. 7 are processed the same as the glass articles employed to generate the "C" data set depicted earlier in FIG. 3.

As the results in FIG. 7 demonstrate, the "C1" and "C2" data sets possess slightly higher average load to failure values (348 and 341 kgf) than the "A" data set, i.e., samples not subjected to any $Ag^+$ ion antimicrobial bath submersion. Further, there does not appear to be any statistical difference between the "C1" and "C2" ROR strength data and the control "A" data set. Accordingly, the data from FIG. 7 suggests that the material removal process involving acid etching between submersion steps can provide antimicrobial glass articles that exhibit the same or even improved average flexural strength as measured by ROR over ion-exchange strengthened glass articles having the same composition, compressive stress and depth of layer, but without being subjected to an antimicrobial treatment and material removal process step.

Figure 8:
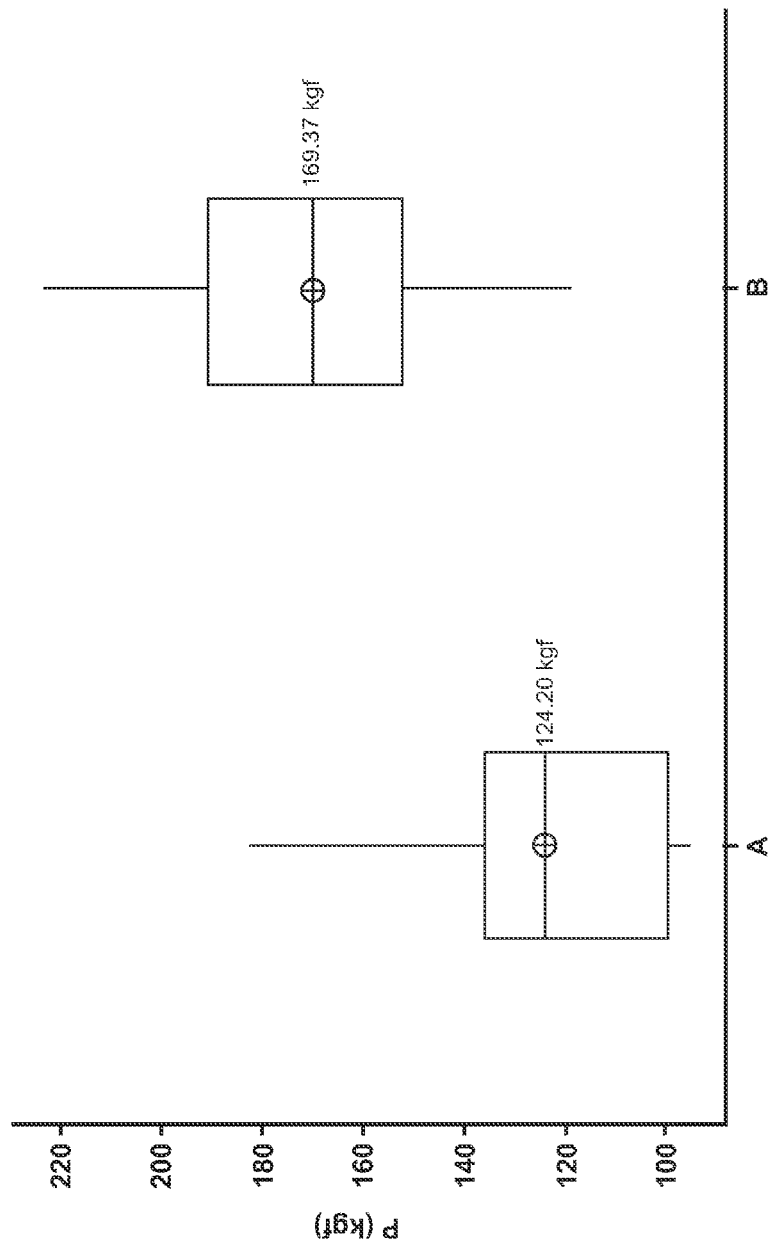
FIG. 8 is a box plot depicting the results from ROR testing of glass articles processed with strengthening and antimicrobial ion exchange baths, with and without a touch polishing surface treatment step, according to a further embodiment.

In FIG. 8, a box plot is presented that depicts the results from ROR strength testing of glass articles processed with strengthening and antimicrobial ion exchange process steps, with and without a touch polishing step, according to a further embodiment. These glass articles were supplied by Corning Incorporated and had a composition of at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO and/or ZnO, and were also tested according to the same conditions as the glass articles depicted in FIG. 7. The glass articles employed to generate the data in FIG. 8, however, had a thickness of 0.55 mm. Accordingly, the load to failure values reported in FIG. 8 are somewhat lower on average than the values reported in FIG. 7 associated with glass articles having a greater thickness, 0.7 mm.

In FIG. 8, the "A" data set corresponds to glass articles ROR tested after ion-exchange strengthening and $Ag^+$ ion antimicrobial bath submersion steps (e.g., comparable to steps 120 and 160 shown in FIG. 1A), with no further material removal steps. The "B" data set corresponds to glass articles ROR tested after being subjected to ion-exchange strengthening and $Ag^+$ ion antimicrobial bath submersion steps (e.g., comparable to steps 120 and 160 shown in FIG. 1A), along with a material removal step employing touch polishing (e.g., comparable to step 140 shown in FIG. 1A) between the bath submersion steps. As the results in FIG. 8 demonstrate, the "A" data set without touch polishing has a lower average ROR value (124 kgf) compared to the average ROR value for the "B" set (169 kgf) with touch polishing. Accordingly, the data from FIG. 8 suggests that the material removal process involving touch polishing can maintain and enhance the strength of ion-exchange strengthened antimicrobial glass articles.

Figure 9A:
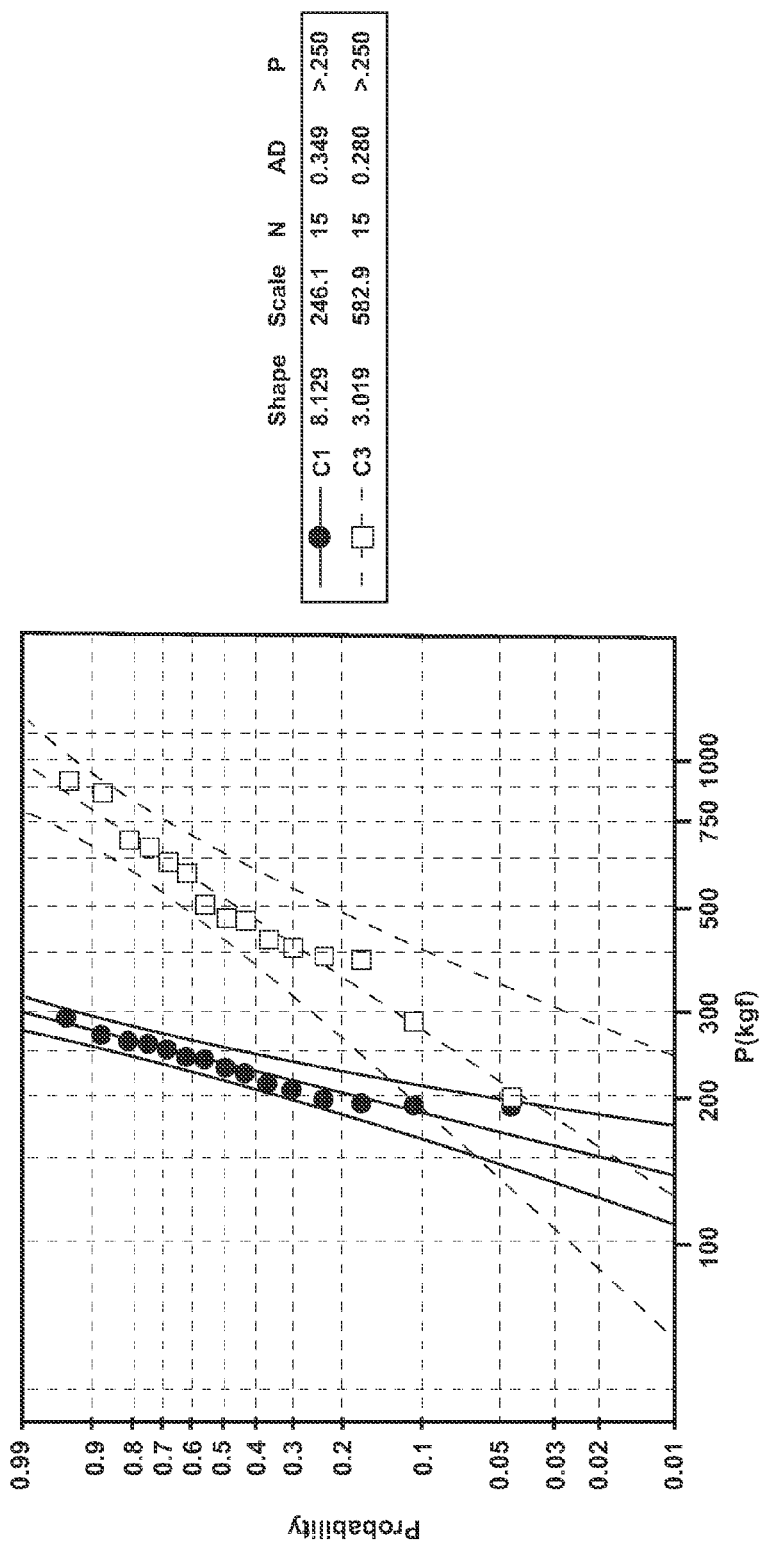
FIG. 9A is a Weibull plot depicting the results from ROR testing of glass articles processed with strengthening and antimicrobial exchange baths, with and without etching with a citric acid/ammonium bifluoride etchant, according to an additional embodiment.

In FIG. 9A, a Weibull plot depicts the results from ROR testing of glass articles processed with strengthening and antimicrobial exchange baths, with and without etching with a citric acid/ammoniumbifluoride ("ABF") etchant according to an additional embodiment. The glass articles tested to generate the data depicted in FIG. 9A had the same aluminosilicate glass composition as the samples tested in FIG. 8 and possessed a thickness of 1 mm. More specifically, the glass article samples were processed in accordance with the method 100 depicted in FIG. 1A with submersion steps 120 and 160. Chemical strengthening was conducted in step 120 in a bath of $KNO_3$ salt at 420° C. for about 2.5 hours. Antimicrobial bath submersion in step 160 was conducted with a bath of 20% $AgNO_3$/80% $KNO_3$ at 350° C. for about 30 minutes. These samples were designated "C1" and were not subjected to any material removal processes or surface treatments in accordance with the embodiments in this disclosure. The "C3" samples, however, were further processed with a removing step 140 in between the submersion steps 120 and 160. The removing step was conducted using an ABF etchant that included 1N citric acid/950 ppm fluoride ions (via ABF) to remove about 2 μm of material from the surface of the "C3" glass articles.

As FIG. 9A demonstrates, the average (ROR-based) flexural strength values for the "C3" group (etched with ABF) are higher with statistical significance than those depicted for the "C1" group (without any material removal steps). As these results demonstrate, the acid etching step (e.g., removing step 140) effectively enhances the strength of the antimicrobial glass articles prepared in accordance with method 100. As used herein, the term "average flexural strength" is intended to refer to the flexural strength of the glass article, as tested through methods such as ring-on-ring, ball-on-ring, or ball drop testing. The term "average" when used in connection with average flexural strength or any other property is based on the mathematical average of measurements of such property on at least 5 samples, at least 10 samples or at least 15 samples or at least 20 samples. Average flexural strength may refer to the scale parameter of two parameter Weibull statistics of failure load under ROR testing. This scale parameter is also called the Weibull characteristic strength, at which the failure probability of a brittle material is 63.2%.

Figure 9B:
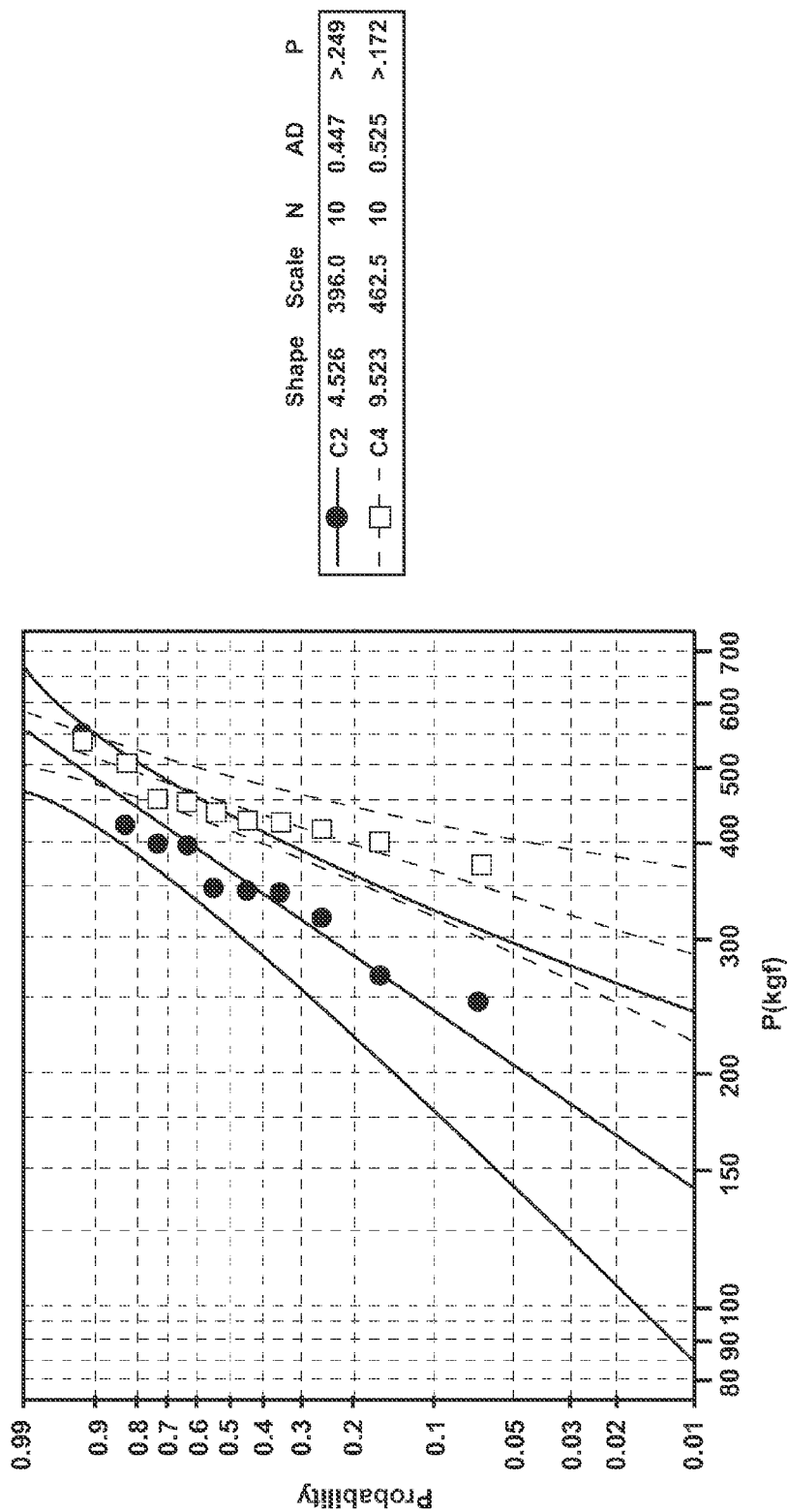
FIG. 9B is a Weibull plot depicting the results from ROR testing of glass articles processed with strengthening and antimicrobial exchange baths, with and without a touch polishing surface treatment step, according to a further embodiment.

Referring to FIG. 9B, a Weibull plot depicts the results from ROR testing of glass articles processed with strengthening and antimicrobial exchange baths, with and without a touch polishing surface treatment step, according to a further embodiment. The glass articles tested to generate the data depicted in FIG. 9B have the same composition and thickness as those tested to generate the data depicted in FIG. 9A. In addition, these glass article samples were processed in accordance with the method 100 depicted in FIG. 1A with submersion steps 120 and 160. Chemical strengthening was conducted in step 120 in a bath of $KNO_3$ salt at 420° C. for about 2.5 hours. Antimicrobial bath submersion in step 160 was conducted with a bath of 20% $AgNO_3$/80% $KNO_3$ at 350° C. for about 30 minutes. These samples were designated "C2" and were not subjected to any material removal processes or surface treatments in accordance with the embodiments in this disclosure. The "C4" samples, however, were further processed with a removing step 140 in between the submersion steps 120 and 160. The removing step was conducted using a touch polishing process employing a grinding wheel to remove about 2 μm of material from the surface of the "C4" glass articles.

As FIG. 9B demonstrates, the average (ROR-based) flexural strength values for the "C4" group (touch polished with a grinding wheel) are higher with statistical significance than those depicted for the "C2" group, without any material removal steps. As these results demonstrate, the touch polishing step (e.g., removing step 140) effectively enhances the strength of the antimicrobial glass articles prepared in accordance with method 100.

Figure 10:
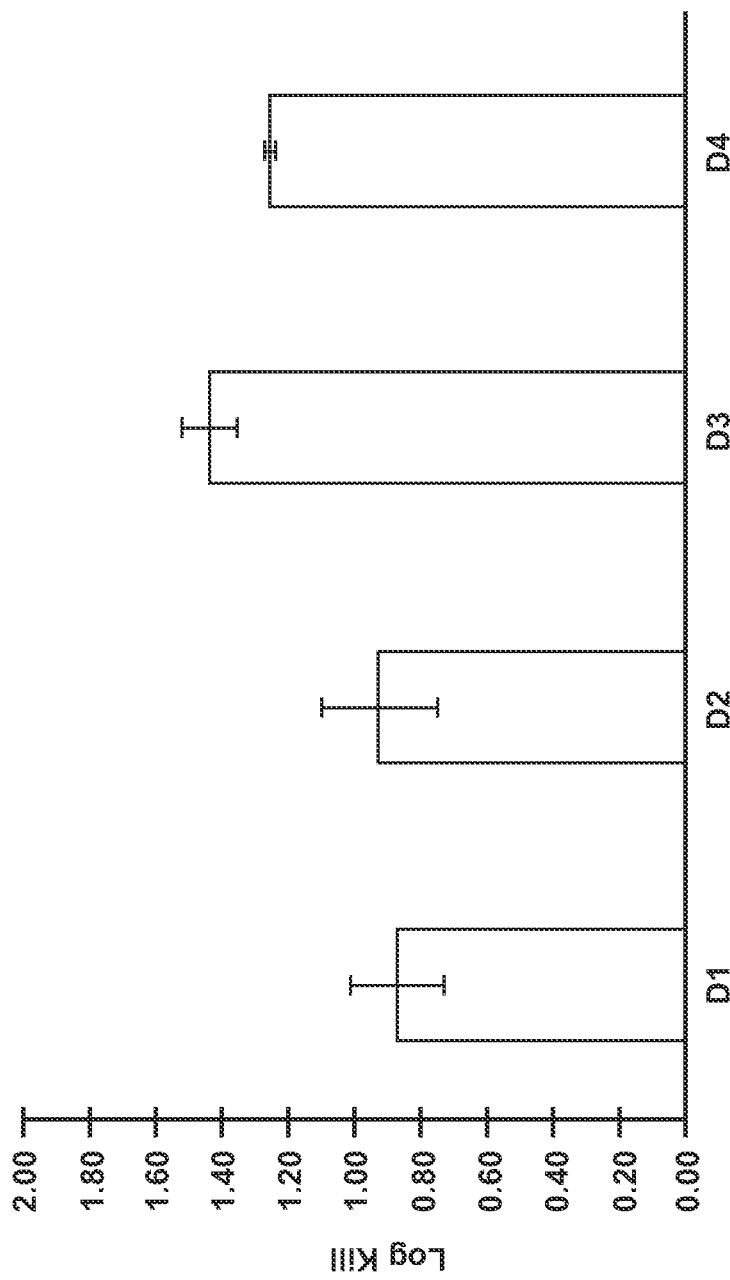
FIG. 10 is a plot depicting the results from antimicrobial testing of glass articles processed with strengthening and antimicrobial exchange baths, with and without etching with a citric acid/ammoniumbifluoride etchant, according to an additional embodiment.

Referring to FIG. 10, a bar chart depicts the results from antimicrobial testing of glass articles processed with strengthening and antimicrobial exchange baths, with and without etching with a citric acid/ammoniumbifluoride (ABF) etchant, according to an additional embodiment. The glass articles tested to generate FIG. 10 are largely comparable to those employed to generate the data depicted in FIGS. 9A and 9B. In particular, the glass articles tested to generate the data depicted in FIG. 10 had the same aluminosilicate glass composition as the samples tested in FIGS. 9A and 9B. The glass articles employed to generate the data depicted in FIG. 10 possessed a thickness of about 0.7 mm. Further, the glass article samples employed to generate FIG. 10 were processed in accordance with the method 100 depicted in FIG. 1A with submersion steps 120 and 160. Chemical strengthening was conducted in step 120 in a bath of $KNO_3$ salt at 420° C. for about 2.5 hours. Antimicrobial bath submersion in step 160 was conducted with a bath of 20% $AgNO_3$/80% $KNO_3$ at 350° C. for about 10 minutes for the "D1" and "D2" groups, and 30 minutes for the "D3" and "D4" groups, respectively. Further, the "D1" and "D3" samples were not subjected to any material removal processes or surface treatments in accordance with the embodiments in this disclosure. The "D2" and "D4" samples, however, were further processed with a removing step 140 in between the submersion steps 120 and 160. The removing step was conducted using an ABF etchant that included 1N citric acid/950 ppm fluoride ions (via ABF) to remove about 2 μm of material from the surface of the "D2" and "D4" glass articles.

The antimicrobial testing associated with the data depicted in FIG. 10 was conducted in accordance with the methods outlined in U.S. Provisional Patent Application No. 61/908,401, incorporated by reference herein. In particular, the primary incubation step was conducted using bacteria dispersed in a phosphate buffered saline solution at an ambient temperature of approximately 30° C., under about 42% relative humidity. As FIG. 10 demonstrates, there is no substantial change in the antimicrobial efficacy of the glass articles in the "D1" through "D4" data series. All of the average log kill values reported for each of four data series "D1" through "D4" were about 1 or higher. Accordingly, FIG. 10 shows that the additional material removal steps employed in the "D2" and "D4" series do not adversely affect antimicrobial performance relative to comparative glass articles processed without the material removal steps.

Figure 11:
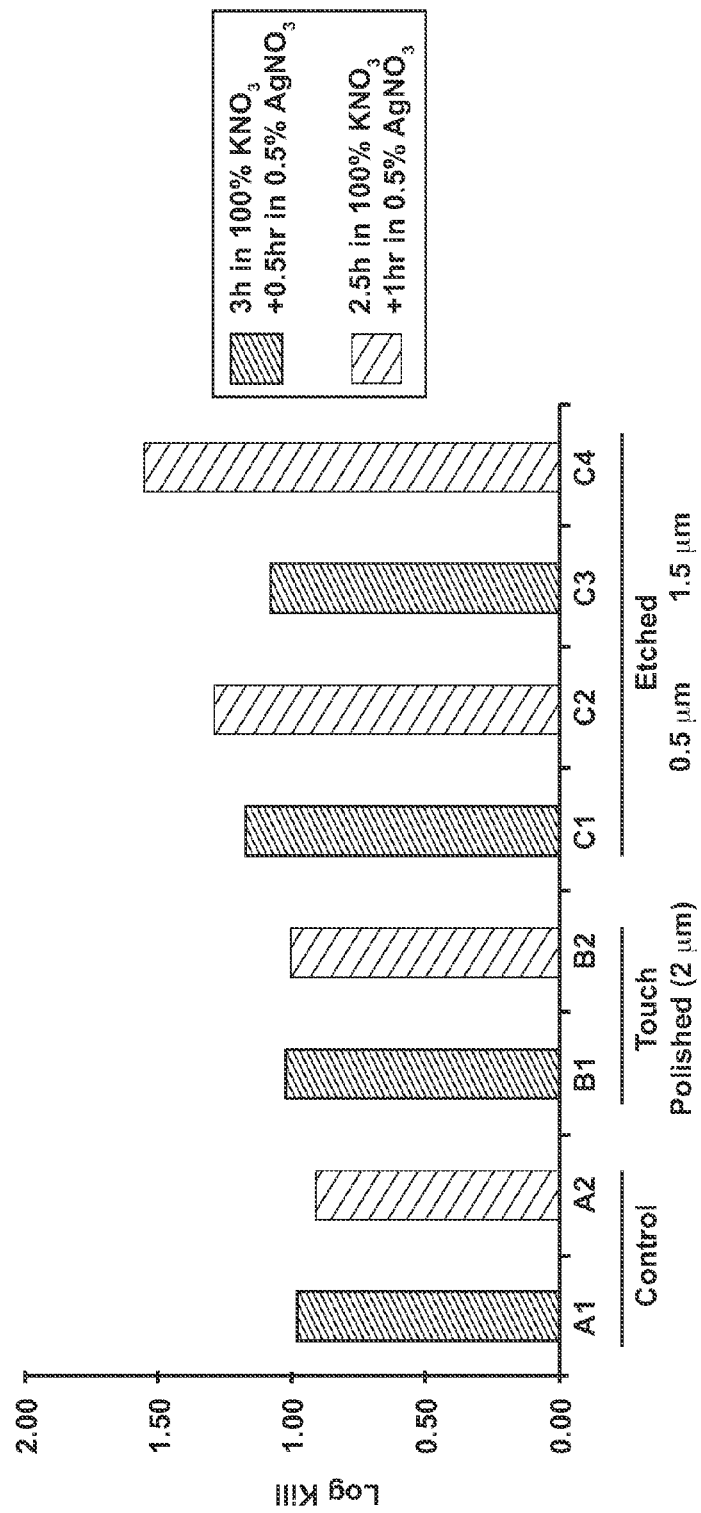
FIG. 11 is a plot depicting the results from antimicrobial testing of glass articles processed with strengthening and antimicrobial exchange baths, with and without etching or touch polishing surface treatment steps, according to a further embodiment.

Referring to FIG. 11, a bar chart depicts the results from antimicrobial testing of glass articles processed with strengthening and antimicrobial exchange baths, with and without material removal steps. The glass articles tested to generate FIG. 11 have an aluminosilicate glass composition largely similar to that of the articles tested to generate the data depicted in FIG. 10. Further, the glass articles employed to generate the data depicted in FIG. 11 possessed a thickness of about 1 mm.

In terms of process conditions, the glass article samples employed to generate FIG. 11 were prepared in accordance with the method 200 depicted in FIG. 1B with submersion steps 220 and 240. Chemical strengthening was conducted in step 220 in a bath of $KNO_3$ salt at 410° C. for about 3 hours for all samples. Antimicrobial bath submersion in step 240 was conducted with a bath of 0.5% $AgNO_3$/99.5% $KNO_3$ at 390° C. for about 30 minutes for the "A1," "B1," "C1," and "D1" groups, and 60 minutes for the "A2," "B2," "C2," and "D2" groups, respectively. Further, the "A1" and "A2" samples were designated as controls in the sense that they were not subjected to any material removal processes or surface treatments in accordance with the embodiments in this disclosure. On the other hand, the "B1" and "B2" samples, and the "C1" through "C4" samples, were further processed with a removing step 260, performed after the submersion steps 220 and 240 were completed, in accordance with the method 200. The removing step 260 comprised a touch polishing procedure for the "B1" and "B2" groups, conducted to remove about 2 μm of material from the surface of the articles. Similarly, the removing step 260 for the "C1" through the "C4" samples was conducted using an ABF etchant that included 1N citric acid/950 ppm fluoride ions (via ABF). For the "C1" and "C2" glass articles, the etching process was employed to remove about 0.5 μm of material from the surface of the articles. The etching process was conducted for a longer duration to remove about 1.5 μm of material from the surface of the "C3" and "C4" glass articles.

The antimicrobial testing associated with the data depicted in FIG. 11 was conducted in accordance with the methods outlined in U.S. Provisional Patent Application No. 61/908,401, incorporated by reference herein. In particular, the primary incubation step was conducted using bacteria dispersed in a phosphate buffered saline solution at an ambient temperature of approximately 30° C., under about 42% relative humidity. Three antimicrobial testing runs were conducted to generate the data associated with each data series reported in FIG. 11. As FIG. 11 demonstrates, there is no substantial change in the efficacy of the glass articles in the "A1" and "A2"; "B1" and "B2"; and "C1" through "C4" data series. All of the average log kill values reported for each of data series were about 1 or higher. Accordingly, FIG. 11 shows that the additional material removal steps employed in the "B1," "B2," and "C1" through "C4" data series do not adversely affect antimicrobial performance relative to comparative glass articles processed without the material removal steps. Furthermore, the use of touch polishing or acid etching also does not appear to influence the antimicrobial efficacy of these glass articles.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

What is claimed is:

1. An antimicrobial glass article, comprising:
   a glass article having a first surface, wherein a surface region between the first surface and about 0.5 μm in depth from the first surface is substantially free of hydrogen penetration;
   a compressive stress layer extending from the first surface of the glass article to a first selected depth in the glass article; and
   an antimicrobial region comprising a plurality of silver ions extending from the first surface to an antimicrobial depth of approximately 3 μm or less in the glass article,
   wherein the first surface of the glass article has a concentration of silver ions that ranges from about 5% to about 70% by weight of $Ag_2O$.

2. The antimicrobial glass article according to claim 1, wherein the first surface is characterized by a morphology consistent with about 0.1 μm to 2 μm of material removal from a polishing treatment or an etching treatment.

3. The antimicrobial glass article according to claim 1, wherein the compressive layer contains a plurality of exchanged alkali metal ions.

4. The antimicrobial glass article according to claim 1, wherein the first surface has a concentration of silver ions that ranges from about 20% to about 40% by weight.

5. The antimicrobial glass article according to claim 1, wherein the first surface has a concentration of silver ions that ranges from about 30% to about 40% by weight.

6. The antimicrobial glass article according to claim 1, wherein the surface region has a hydrogen penetration as measured by Secondary Ion Mass Spectrometry (SIMS) of about 1000 counts/second or less.

7. The antimicrobial glass article according to claim 1, further comprising:
   a residual antimicrobial region comprising one or more silver ions and extending from the antimicrobial depth to a residual antimicrobial depth.

8. The antimicrobial glass article according to claim 1, wherein silver ions are not appreciable at a depth of 1500 nm or greater from the first surface of the glass article.

9. An antimicrobial glass article, comprising:
   a glass article having a first surface wherein a surface region between about 0.1 μm and about 0.5 μm in depth from the first surface is substantially free of hydrogen penetration;

a compressive stress layer extending from the first surface of the glass article to a first selected depth in the glass article; and an antimicrobial region comprising a plurality of silver ions extending from the first surface to an antimicrobial depth of approximately 3 µm or less in the glass article, wherein the first surface of the glass article has a concentration of silver ions that ranges from about 5% to about 70% by weight of $Ag_2O$.

10. The antimicrobial glass article according to claim 9, wherein the first surface is characterized by a morphology consistent with about 0.1 µm to 2 µm of material removal from a polishing treatment or an etching treatment.

11. The antimicrobial glass article according to claim 9, wherein the compressive layer contains a plurality of exchanged alkali metal ions.

12. The antimicrobial glass article according to claim 9, wherein the first surface has a concentration of silver ions that ranges from about 20% to about 40% by weight.

13. The antimicrobial glass article according to claim 9, wherein the first surface has a concentration of silver ions that ranges from about 30% to about 40% by weight.

14. The antimicrobial glass article according to claim 9, wherein the surface region has a hydrogen penetration as measured by Secondary Ion Mass Spectrometry (SIMS) of about 1000 counts/second or less.

15. The antimicrobial glass article according to claim 9, further comprising:

a residual antimicrobial region comprising one or more silver ions and extending from the antimicrobial depth to a residual antimicrobial depth.

16. The antimicrobial glass article according to claim 9, wherein silver ions are not appreciable at a depth of 1500 nm or greater from the first surface of the glass article.

* * * * *